United States Patent [19]

Ashbee et al.

[11] Patent Number: 4,457,506
[45] Date of Patent: Jul. 3, 1984

[54] SERVO-CONTROLLED AUTOMATIC DOCUMENT FEEDER

[75] Inventors: William H. Ashbee, Boulder; Mark A. Beran, Niwot; Donald F. Colglazier, Longmont; Donovan M. Janssen, John P. Mantey, both of Boulder; Ronald J. Martin, Loveland; Gerald P. Patch, Larry E. Rittenhouse, both of Boulder; James A. Valent, Longmont; all of Colo.

[73] Assignee: International Business Machines Corporation, Armonk, N.Y.

[21] Appl. No.: 302,877

[22] Filed: Sep. 16, 1981

[51] Int. Cl.³ .................. B65H 5/22; B65H 31/12
[52] U.S. Cl. ............................... 271/3.1; 271/65; 271/186; 271/DIG. 9; 271/270; 355/14 SH; 355/23
[58] Field of Search ............ 271/3.1, 65, 186, 303, 271/DIG. 9, 259, 261, 264, 265, 266, 270; 355/23, 24, 3 SH, 14 SH, 75

[56] References Cited

U.S. PATENT DOCUMENTS

| Re. 27,976 | 4/1974 | Sahley | 355/64 |
|---|---|---|---|
| 3,599,967 | 8/1971 | Rapparlie et al. | 271/12 |
| 4,000,943 | 1/1977 | Bar-on | 355/8 |
| 4,078,787 | 3/1978 | Burlew et al. | 271/3.1 |
| 4,093,372 | 6/1978 | Guenther | 271/3.1 |
| 4,099,150 | 7/1978 | Connin | 271/3.1 |
| 4,126,817 | 11/1978 | Luzio | 318/7 |
| 4,140,387 | 2/1979 | Gustafson | 271/3.1 |
| 4,158,500 | 6/1979 | DiFrancesco et al. | 271/3.1 |
| 4,169,674 | 10/1979 | Russel | 355/14 |
| 4,176,945 | 12/1979 | Holzhauser et al. | 271/65 |
| 4,278,344 | 6/1981 | Sahay | 271/3.1 |
| 4,319,833 | 3/1982 | Hidding | 271/3.1 |
| 4,345,751 | 8/1982 | Holhauser | 271/3.1 |
| 4,368,973 | 1/1983 | Silverberg | 271/3.1 |

FOREIGN PATENT DOCUMENTS 20973  1/1981  European Pat. Off. ............ 271/3.1

OTHER PUBLICATIONS

Research Disclosure No. 19803, Oct. 1980, Holzhauser.
IBM Tech. Disc. Bull., vol. 22, No. 4, Sep. 1979, Ho.

*Primary Examiner*—Bruce H. Stoner, Jr.
*Assistant Examiner*—James E. Barlow
*Attorney, Agent, or Firm*—C. E. Rohrer; J. G. Cockburn

[57] ABSTRACT

A servo-controlled recirculating automatic document feeder (RADF) includes a plurality of independently driven document transport devices. A picker mechanism separates documents in seriatim from a stack. An entry turnaround transport device buffers and delivers picked documents to a platen transport device for exposure. After exposure, the document is transported along a simplex or duplex path for duplex or simplex copying. The document is then buffered in an exit turnaround transport device and is subsequently returned to the stack. Each transport device is independently driven by a motor and a closed-loop servo. A common reference oscillator generates source signals for the servo-loops. A microcomputer operates on the source signals and generates reference signals for driving the transport devices.

9 Claims, 15 Drawing Figures

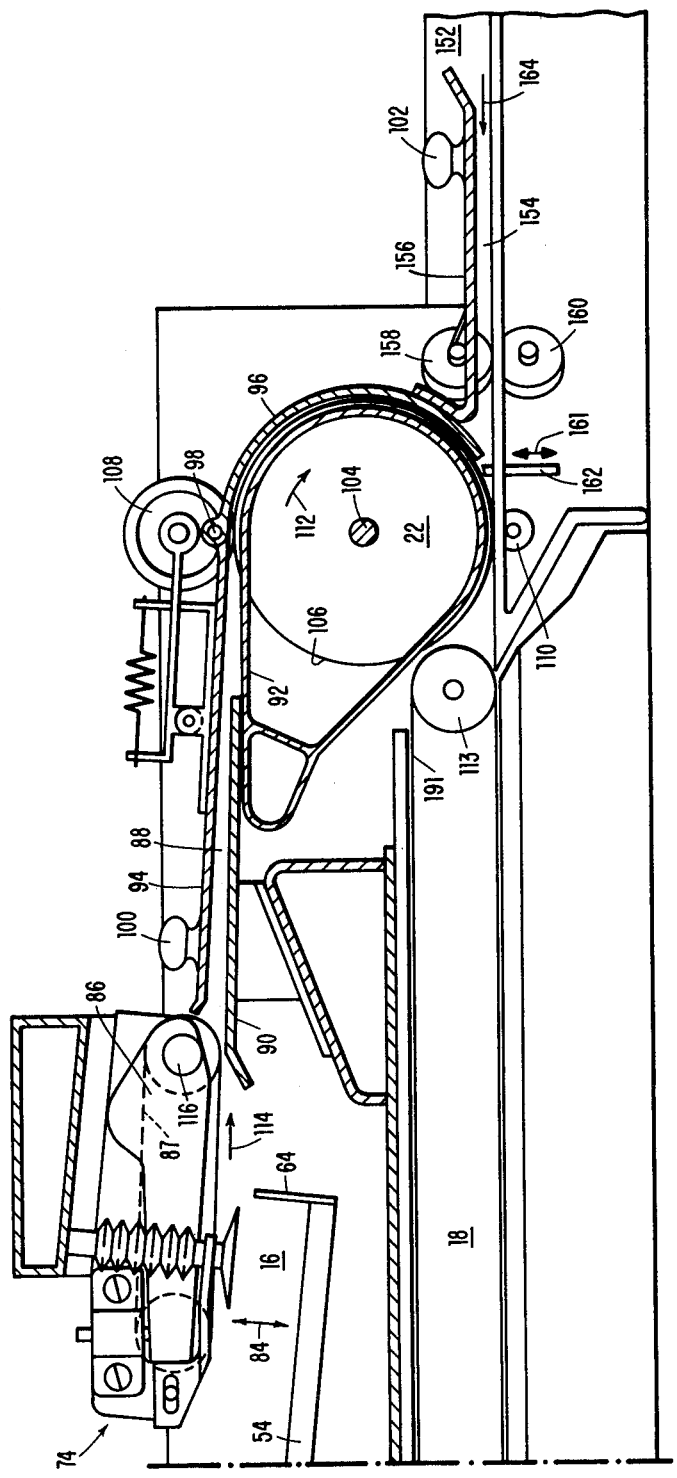

SERVO-CONTROLLED AUTOMATIC DOCUMENT FEEDER

CROSS-REFERENCE TO RELATED PATENT APPLICATIONS

Reference is made to the following U.S. Applications:

Application Ser. No. 262,727, filed May 11, 1981, entitled "Document Feeder Electronic Registration Gate" describes an electronic gate for registering sheets on the document platen of a convenience copier.

Application Ser. No. 056,170, filed July 9, 1979, entitled "Bottom-Up Stacker" describes a document feeder wherein sheets are fed from the top and stacked on the bottom of a stack.

U.S. Pat. No. 4,382,593, entitled "Vacuum Document Feeder" describes a vacuum picker for separating sheets one by one from a stack.

BACKGROUND OF THE INVENTION

1. Field of the Invention

The present invention relates to document feeding apparatus in general and, more particularly, the invention relates to a combined recirculating automatic document feeder (RADF) and a semiautomatic document feeder (SADF).

2. Prior Art

The use of document feeders for advancing sequential pages of a document onto the exposure platen of an electrophotographic copier for copying, is well known in the prior art. Prior art document feeders can be broadly classified into three groups; namely, automatic document feeders (ADF), recirculating document feeders (RADF) and semiautomatic document feeders (SADF).

U.S. Pat. No. Re 27,976 (Sahley) is an example of prior art ADF. The ADF is adapted to feed the pages of a document to be copied from a document supply station to the copying or viewing window of a copier duplicator. Once a page is correctly positioned on the document platen, the imaging mechanism of the copier is initiated and a latent image of the page is formed on the photoconductor of the copier. The image is subsequently processed to form a copy of the original page.

The ADF of the subject patent consists of a document supply station and a document receiving station. The document supply station and the document receiving station are disposed on opposite sides of the viewing window and in linear alignment therewith. Each of the stations includes a document support tray and a sheet feed mechanism for feeding a sheet from the bottom of the tray. Each of the document support trays is fitted with a slot through which a page enters or leaves the tray. At the supply station, the sheet leaves the tray through the slot. At the receiving station, the sheet enters the tray through the slot. A movable gate is disposed relative to each slot and guides an extracted sheet onto the exposure platen.

In operation, an operator loads a stack of sheets to be copied into one of the trays. The sheets are arranged so that the side of the page containing the printed matter faces downwardly with page one being at the bottom of the stack. If multiple or collated sets of the document are needed, the operator sets the feeder accordingly to indicate the number of sets. The feed mechanism feeds the first sheet of the document from the bottom of the stack onto the exposure platen. After copying, the document is returned to the other receiving tray which is disposed on the opposite side of the platen. The process continues until all the pages of the document are copied and are stacked at the receiving tray. If the feeder had been set to provide multiple copies of the document, the document would then be fed page-by-page from the receiving tray onto the viewing window there it would be exposed and stacked into the supply tray. The process continues until the document is exposed the desired number of times to the copying machine to provide a selected number of copies. When the document has been fed the required number of times, the feeder is automatically shut off.

Although the ADF works satisfactorily for its intended purpose, it tends to be costly. Additionally, the use of a document supply and document receiving station unduly expands the overall length of the copier to which they are attached. As described above, the ADF is comprised of two identical sections. Each section includes identical parts and as such, increase the overall cost. Similarly, the length of the system increases because the section must be attached to opposite sides of the document exposure platen.

In addition to the above defects, the Sahley patent lacks the capability of processing a duplex original so that both sides of the document can be copied at the document platen.

In an attempt to solve the defects associated with the above-described patent, the prior art introduced the recirculating automatic document feeder. This type of document feeder is disposed above the document platen or exposure platen of the copier. The feeder includes a single document supply tray which is positioned above the platen. Documents to be copied are placed on the tray. Pages of the documents are transported in sequence to the platen where they are exposed and then returned to the stack. If multiple sets of a document are selected, each page of the document will be exposed for a predetermined number of times at the exposure platen.

U.S. Pat. No. 4,176,945 (Holzhauser et al.) is an example of the prior art recirculating feeder. This recirculating feeder also includes a document positioner. The recirculating feeder consists of a hopper which is placed above the exposure platen and in spaced relation thereto. The bottom of the hopper is fitted with an opening through which pages of original documents are sequentially extracted. A reciprocating vacuum device is disposed relative to the opening. The document positioner consists of a sheet feed device disposed along a paper path separate and distinct from the nonrecirculating paper path.

In operation, a multipage document is placed in the hopper. The document is placed with the pages arranged in normal sequential order. The first page is at the top of the stack and the last page at the bottom. The printed information is also arranged in normal sequential order with side one of each page facing upwardly. As sheets are extracted from the bottom of the stack, they are forced to traverse a first curved channel path. As a result, the sheet is turned over with the side one facing downwardly in the platen. A plurality of feed rollers are disposed on the platen and position the sheet for copying. If the sheet is a simplex copy, it is forced to traverse a second curve channel where it is inverted and is fed onto the top of the stack with side one facing upwardly.

If the sheet has printing on both sides (duplex original), after it is picked from the stack it is transported across the platen and it is forced to follow a third curve channel path where it is flipped and side two is placed on the document platen for copying. After copying, the sheet is forced to follow the third curve channel where it is again flipped and is positioned on the document glass for side one copying. After side one is copied, the document is transported along the second curve channel where it is flipped and is restacked on top of the stack with side one facing upwardly. A sheet diverter is disposed at the junction of the second and third curve channel paths and divert the sheet to follow the appropriate path.

The recirculating feeder is also fitted with a document positioner. The document positioner handles odd-sized sheets which cannot be accommodated by the recirculating section of the feeder or normal-sized sheets when only a few copies are needed. The document positioner consists of a tray on which document sheets are placed with information to be copied facing downwardly. The sheet is advanced manually from the tray until the leading edge of the sheet activates a switch whereupon a plurality of feed rollers feed the sheet into a registration mechanism. From the registration mechanism, the sheet is fed onto the copier platen. After copying, the sheet is fed through the third curved path to an output tray. It should be noted that for duplex originals, the throughput of the above recirculating feeder is reduced. The reduction in throughput partly occurs because for duplex originals, the sheet is transported across the document platen to the duplex inverting sheet path. The inverted sheet is then brought back to the platen where side two is copied. The sheet is transported for a second time through the duplex inverting path and is brought back to the platen for side one copying. The sheet is then forced to follow the recirculating path where it is flipped and is placed in the sheet support bin with side one facing upwardly.

It should be noted that the first time that a duplex original is transported over the platen, the sheet is not copied and as such, valuable time is wasted which results in reduction in the throughput. Any attempt to copy the sheet in the first pass will result in the sheets being placed in the reverse order in the document tray. If the original sheets are in reverse order (that is side two of each page facing upwardly) one cannot make multiple sets of a multipage document with the copy sheets for each set arranged in sequential order.

U.S. Pat. No. 4,099,150 (Connin) is another example of prior art devices which circulate and recirculate original documents for copying. The device is capable of presenting simplex and duplex originals for copying. The device consists of a pair of document holding hoppers disposed in spaced relationship on top of one another in a vertical orientation. Duplex documents to be copied are placed in the upper hopper with the odd side of each page facing upwardly. The documents are fed from the top of the upper hopper inverted, and placed in the lower hopper. The documents are then fed from the bottom of the lower hopper onto the platen so that the even side of each document is copied. After copying, the document is inverted and is placed on the top of the stack in the second hopper. The bottom feed procedure is repeated and the odd side of each page is copied. The pages are then stacked into the upper hopper.

U.S. Pat. No. 4,140,387 is yet another example of a prior art recirculating document feeder. The recirculating feeder consists of a receiving hopper in which a set of sheets to be copied is placed with the printed information facing upwardly. The sheets are prepared for copying by inverting them and placing them in a second hopper. The sheets are then transported through a plurality of complex arcuate paths to the document platen of a copier for simplex (one-sided) or duplex (two-sided) copying.

U.S. Pat. No. 4,169,674 is still another prior art recirculating document feeder which circulates sheets for simplex copying at the platen of a convenience copier. The recirculating document feeder consists of a document supply tray disposed above the platen of the convenience copier. A single loop paper path interconnects the exit end of the tray to the input end. A pair of rotating vacuum cylinders are disposed, one at each end of the tray. As a sheet is extracted from the tray, it is flipped by one of the cylinders. As it is restacked in the tray, the sheet is again flipped by the other cylinder. Although the paper path is relatively simple, the device cannot handle duplex originals.

Although the above-described document feeders work well for their intended purposes, the paper path along which a document is transported tends to be complex. This complexity tends to reduce the throughput of documents handled by the devices. The degradation in throughput is particularly pronounced when duplex originals are being handled.

Another type of problem which is associated with complex paper paths is that the document feeders are susceptible to paper jams and ultimate damage to original documents.

Another general type of problem which is associated with the above-described prior art document feeders is their inability to reposition a previously copied sheet on the document glass (without recycling through the sheets in the stack) for recopying. Oftentimes a paper jam or other malfunction occurs in a copier machine. As a result, a transfer image is destroyed with the copy sheet. In order to form a complete set of copy sheets, it is necessary to replace the original sheet for reexposure, etc. However, due to the fact that the prior art document handlers make a direct transfer of original sheets from the exposure platen to the sheet supply tray, they cannot perform consecutive exposure of a previously exposed sheet. Of course, by recycling through the stack to the point where the sheet is placed, one may be able to obtain and reposition the sheet for reexposure. However, such a procedure is time-consuming, complex and is therefore unacceptable.

SUMMARY OF THE INVENTION

It is therefore the object of the present invention to provide an improved recirculating automatic document handler which utilizes a simple paper path to present simplex and/or duplex originals to the document platen of a copier for simplex and/or duplex copying.

It is another object of the present invention to provide an automatic document feeder which presents and represents a single sheet to the document platen of a copier for consecutive exposure.

The improved automatic document handler is adaptable to present and represent documents to the document platen of a convenience copier. The automatic document handler includes a document support tray adaptable to support a stack of sheets. A picker mechanism picks sheets in sequential order from the top of the stack. The picked sheets are delivered by a belt transport to an entry document turnaround mechanism. The turnaround mechanism flips the sheet so that the side which was facing upwardly in the support tray is now facing downwardly. A platen transport mechanism accepts the flipped sheet and registers the sheet at the document platen for copying. A sheet diverting mechanism is disposed relative to the platen transport mechanism and forces the sheet to follow a simplex paper path or a duplex paper path. The simplex and duplex paper paths diverge around a common exit document turnaround mechanism. Sheets which are deflected along the duplex path are flipped and side two is presented for copying. After copying, the sheet is restacked in the document support tray. Sheets which are diverted along the simplex path are flipped by the exit turnaround prior to stacking in the tray.

The entry turnaround mechanism, the platen transport mechanism and the exit turnaround mechanism are configured to form a single closed loop paper path which interconnects the exit of the document tray with the input. This closed-loop path is utilized by simplex originals. The duplex path is disposed within the closed-loop path. This configuration enables a single turnaround mechanism to be used to invert both simplex and duplex originals. This arrangement also contributes to the simplified paper path of the present invention.

The entry turnaround mechanism, the platen transport mechanism and the exit turnaround mechanism are all driven by independently controlled motors. Each of the motors are controlled by a closed-loop servo. Reference signals for each of the servo loops are derived from a common reference oscillator. The reference signals and feedback signals from each motor are processed by a controller (microprocessor) which generates positional signals for driving the motors.

One embodiment of the present invention includes a semiautomatic document feed (SADF) paper path. This paper path is relatively straight and is defined by the lower run of the platen transport belt, an input sheet feed mechanism and the sheet diverting mechanism. The sheet feed mechanism is activated by the leading edge of a sheet. The sheet is often positioned by an operator. The platen belt positions the sheet for copying and after copying, it is diverted into the exit pocket of the copier. It does not traverse the simplex or the duplex paper path.

Another feature of the present recirculating automatic document feeder is in its error recovery capabilities. For this feature, the exit and entry turnaround mechanisms are utilized as temporary document buffers. In the event that a copy sheet is damaged in the copier, the document at the exit turnaround is repositioned on the document glass for recopying. Another feature of the error recovery capabilities is that should malfunction occur in a portion of the machine, documents in the exit turnaround and on the document platen are processed and restacked before the system is turned off.

Yet another feature of the present invention lies in its self-diagnostic capabilities. The feature is achieved by disposing sheet sensing sensors at strategic points of the paper path.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

Figure 1:
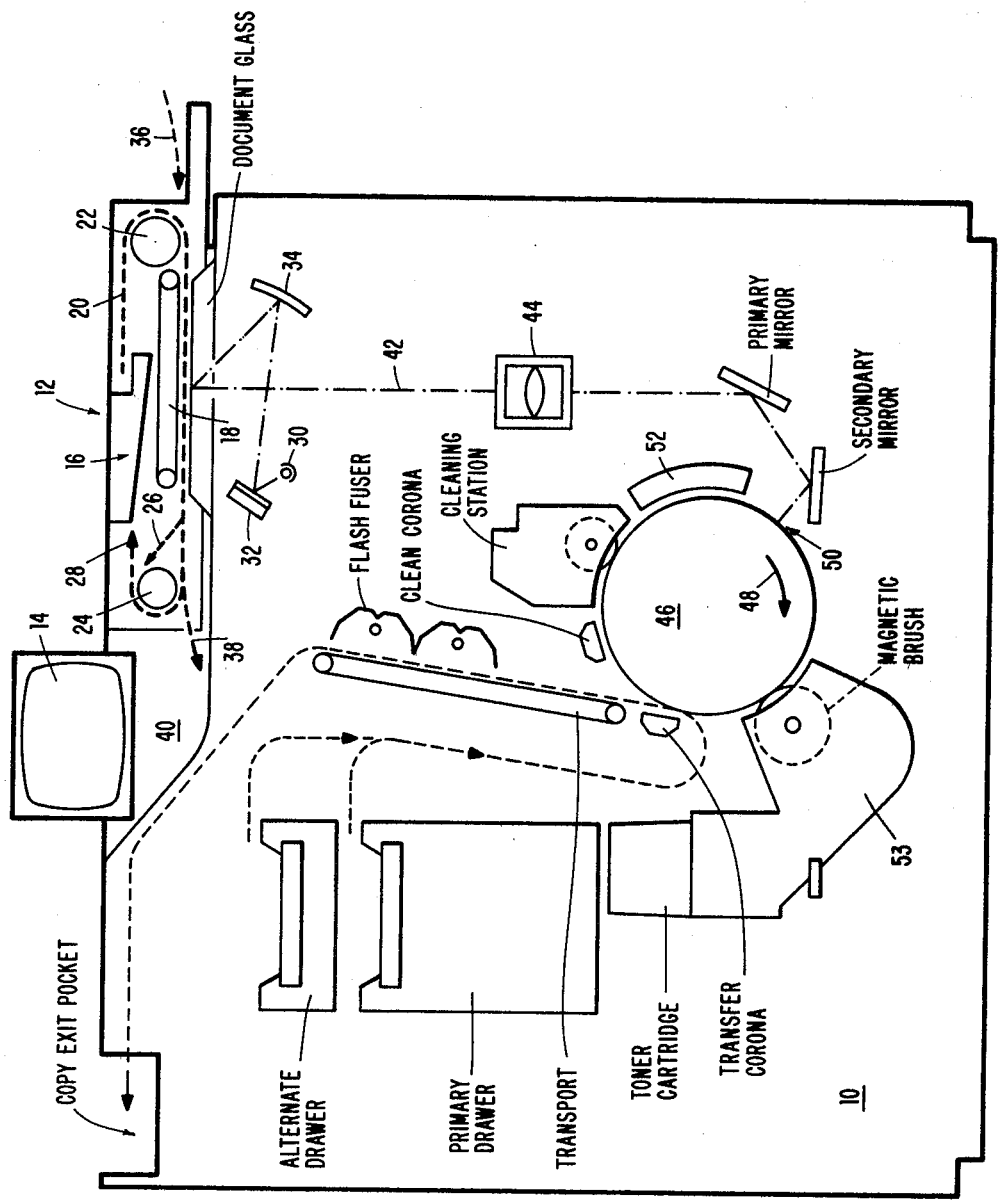
FIG. 1 is a schematic front elevation view of a recirculating automatic document feeder (RADF) coupled to an electrophotographic copier.

Before proceeding with a detailed description of the recirculating automatic document feeder according to the teaching of the present invention, a summary of the document feeder will first be given followed by a summary description of an electrophotographic copier with which the described recirculating automatic document feed, hereinafter called RADF, will be used. It should be understood that the RADF, according to the teaching of the present invention, can be used with any type of duplicating or reproducing machine in which it is required to present and represent sheet-like material on the document platen for copying. The RADF works well with a convenience copying machine, and will be described within that environment. However, this should not be construed as a limitation on the RADF, since it is intended that its use not be restricted to a convenience copier but to other types of reproducing machines.

The present RADF includes a support frame which is adaptable to support the various elements of the RADF. The RADF includes a document support tray which is mounted to the frame. The tray is adaptable to support a stack of original documents which are to be copied by the convenience copier or other utilization devices. A vacuum transport belt is mounted in a general horizontal plane below the document support tray. A vacuum picker mechanism is mounted above the document support tray. The picker mechanism is adapted to pick separate and lift the topmost sheet from a document stack to an exit station. At the exit station, the sheet is delivered to a vacuum transport belt which is disposed relative to the vacuum picker assembly. The picked sheet is transferred by the vacuum transport belt to an entry turnaround mechanism. The entry turnaround mechanism transports and forces the picked sheet to traverse an arcuate path of approximately 180°. As a result, the sheet is inverted or flipped so that the side which was facing upwardly in the support tray now faces downwardly. The inverted sheet is next delivered to the vacuum transport belt which transports the sheet and registers the sheet for exposure on the document platen of the utilization device. A three-positioned gating mechanism is disposed on the downstream side of the platen transport belt. A second turnaround mechanism is disposed downstream from the three-positioned gating mechanism. As sheets are transported from the document platen, the gate is controlled so that if the sheet is a duplex original, the sheet is forced to traverse the exit turnaround in a counterclockwise direction where it is inverted and is returned to the glass for side two copying. After side two copying, the sheet is forced to traverse a noninverting path to an input station where it is restacked into the support tray with side one facing upwardly.

In the event that the sheet was a simplex original, the gating mechanism is positioned so that the sheet traverses the exit turnaround in a clockwise direction and as such, is flipped prior to entering the document support tray. By flipping the simplex original prior to restacking it into the input station of the document support tray, the sheet is oriented in its proper position with side one facing upwardly.

The document handler also includes a nonrecirculating path referred to as the semiautomatic document feed (SADF) paper path. This path includes a pair of sheet feed rollers disposed on the upstream side of the entry turnaround and the vacuum platen transport belt. This noncirculating path enables an operator to interrupt RADF operations and to make a copy of one or more sheets. To this end, the operator feeds a sheet by hand along a SADF paper channel. The leading edge of the sheet activates a feed roll mechanism which feeds the sheet into registration against an entry gate. When the gate drops, the registered sheet is driven by the sheet fold rollers until it is picked up by the platen transport belt. As before, the sheet is registered on the document platen. After copying, the multiposition deflection gate is deflected to a third position which forces the sheet to traverse a straight path which diverges from the recirculating path.

Electrophotographic Copier

Referring now to the drawings, and in particular to FIG. 1, there is shown an electrophotographic copying system including an electrophotographic copier 10, a document handler 12 and an operator input control panel 14. The control panel 14 is utilized by an operator to communicate with the electrophotographic copier 10. By way of example, the operator uses the control panel to inform the system as to whether the original documents which are disposed in the document tray 16 are simplex or duplex originals. As is used in this application, simplex original means an original document which has readable characters on one side only. Likewise, duplex original means an original document that has readable characters on both sides. Similarly, the operator utilizes the control panel to inform the system as to the number of copies. The panel also informs the system as to whether or not the copies should be collated, etc.

The document handler 12 includes a frame which supports the various elements of the RADF and is used for mounting the RADF onto the frame of copier 10. Such elements as the frame and means for mounting the frame can well be generated by an artisan having ordinary skill in the mechanical art, and as such, will not be described in detail. Suffice it to say that the document handler 12 is mounted to the frame of the copier so that when it is in the down position, the platen transport mechanism 18 is disposed in close proximity to the document glass of the copier, and when the document handler 12 is in the up or remote position, it is disposed upwardly, that is separated from the document glass. In the up position an operator has access to the document glass.

It should be noted that since the copier system is well known in the prior art, only those elements which are necessary to understand the coaction of the copier with the preferred embodiment of the RADF will be described.

The RADF is adaptable to present and represent simplex and/or duplex original documents to the document glass for copying by the copier 10 automatically. To this end, a stack of original documents (not shown) to be copied are loaded into document support tray 16. The documents are loaded in its natural sequential order with side one of the first page facing upwardly (that is towards the operator). For simplex or one-sided documents, all the sides containing readable information face upwardly. For duplex originals, that is originals having readable information on both sides, side 1, 3, 5, etc. (that is the odd side of each page) faces upwardly while the even side, that is side 2, 4, 6, etc. face downwardly. The document is picked from the top of the stack, transported along paper transport path 20 where it is inverted by entry turnaround means 22 and is registered on the document glass for copying by the platen transport mechanism 18. If the original is a simplex original, it is forced in a clockwise direction in an arcuate channel about exit turnaround roll 24. As it traverses the turnaround roll, the sheet is again flipped and is fed through an exit channel to the input station where it is placed at the bottom of the stack in tray 16 with side one facing upwardly.

If the sheet is a duplex original, during its first presentation on the document glass, side one is copied. The sheet is then deflected to traverse duplex paper path 26 where it is forced to traverse the exit turnaround 24 in a counterclockwise direction in the arcuate channel 124 and is represented on the document glass by the transport mechanism for side two copying. Following side two copying, the sheet is again transported along paper path 26 for a partial motion in the counterclockwise direction about exit turnaround means 24. The sheet is then transported in the direction identified by arrow 28 where it is restacked at the bottom of the stack in its proper orientation with side one facing upwardly and side two facing downwardly. By utilizing a single turnaround to effectuate simplex or duplex flipping, the number of parts which are utilized to manufacture the document handler 12 is significantly reduced. It also enables a minimum handling of an original document and also enhances system throughput.

Oftentimes it is required for a copying system to make a few copies of a document which do not form part of the document in the RADF. Sometimes the document is not suitable to be placed within the RADF. To this end, a semiautomatic document feed (SADF) paper path is provided. The SADF paper path intercepts and runs coextensive with the RADF paper path in the vicinity of the document glass. To this end, the operator loads a document to traverse the first section of the SADF document path identified by numeral 36. The leading edge of the document is grasped by the entry turnaround mechanism and is delivered to transport mechanism 18. As before, transport mechanism 18 registers the document on the document glass. After copying, the document is diverted through a third section of the SADF paper path identified by numeral 38 where it is ejected into a document exit pocket 40.

Still referring to FIG. 1, once the document is properly registered for copying on the document platen, the document is illuminated by light rays provided by illumination source 30 and reflected through mirrors 32 and 34 respectively. A footprint of the document is propagated along optical path 42 into an optical system comprised of a lens 44. A primary and secondary mirror reflect light rays propagating along the optical path 42 onto the photosensitive layer of a photoconductor drum 46 where a latent image of the document at the document glass is formed. The photoconductor drum 46 is mounted for rotation in the direction shown by arrow 48. Prior to the positioning of the drum at the imaging station 50 where a latent image of the document is deposited thereon, a charge corona 52 deposits a charge on the surface of the photoconductor drum. At the exposure station 50, the surface of the photoconductor is selectively discharged. The nondischarged areas represent the informational contents of the information recorded on the document. At the development station 53, a magnetic brush deposits microscopically fine developing material, such as toner, on the drum. The toned image is transferred to a transfer media such as paper extracted from a primary paper drawer or an alternate paper drawer. The transfer image is next fixed onto the paper by the flash fuser mechanism where it is delivered along the paper path identified by the arrow into the copy sheet exit pocket. Nonflash fusing mechanisms may also be used to fuse the image. The photoconductor is next charged in opposite polarity by the clean corona and the cleaning brush positioned at the cleaning station which removes the residual toner from the photoconductor surface. After the cleaning step, the photoconductor is then ready for performing another cycle.

Recirculating Automatic Document Feeder

In FIG. 1 the document handler 12 comprised of a RADF and a SADF is shown coupled to a convenience copier. When using the RADF, a plurality of sheets are rapidly fed in succession from the support document platen 16, inverted by entry turnaround means 22, and positioned by the platen transport mechanism 18 on the document glass for copying. After copying, if the sheet is a simplex original, it is forced around the exit turnaround means 24 in a clockwise manner where it is inverted and is restacked in tray 16 at the bottom of the stack. If the sheet is a duplex original, it is forced to traverse the duplex paper path identified by number 26. It is then forced to traverse the exit turnaround means 24 in a counterclockwise direction and repositioned again on the document glass for side two copying. After side two copying, the sheet is transported along the paper path identified by numerals 26 and 28, respectively. The sheet is then restacked at the bottom of the stack. Whether the sheet is simplex original or duplex, it is restacked in the sheet support tray 16 in its original sequence in which it was loaded in the tray.

In the situation where an operator wants to make a copy of the sheet without passing it through the closed loop path of the document handler 12, the operator can insert the sheet along the paper path identified by arrow 36 where it is transported by document platen transport means 18 for copying on the document glass and is then ejected along path 38 into the original document exit tray 40. The operation of document handler 12 is interlocked with that of the convenience copier 10 by a microprocessor. The interlocking relationship between the document handler and the copier will be described hereinafter. The document handler 12, according to the teaching of the present invention, is highly reliable, maintains a high degree of throughput and requires very little operator intervention. For example, the RADF handles duplex documents without the need for intervention by an operator. Also, the RADF throughput for duplex originals is the same as for simplex originals.

Figure 2A:
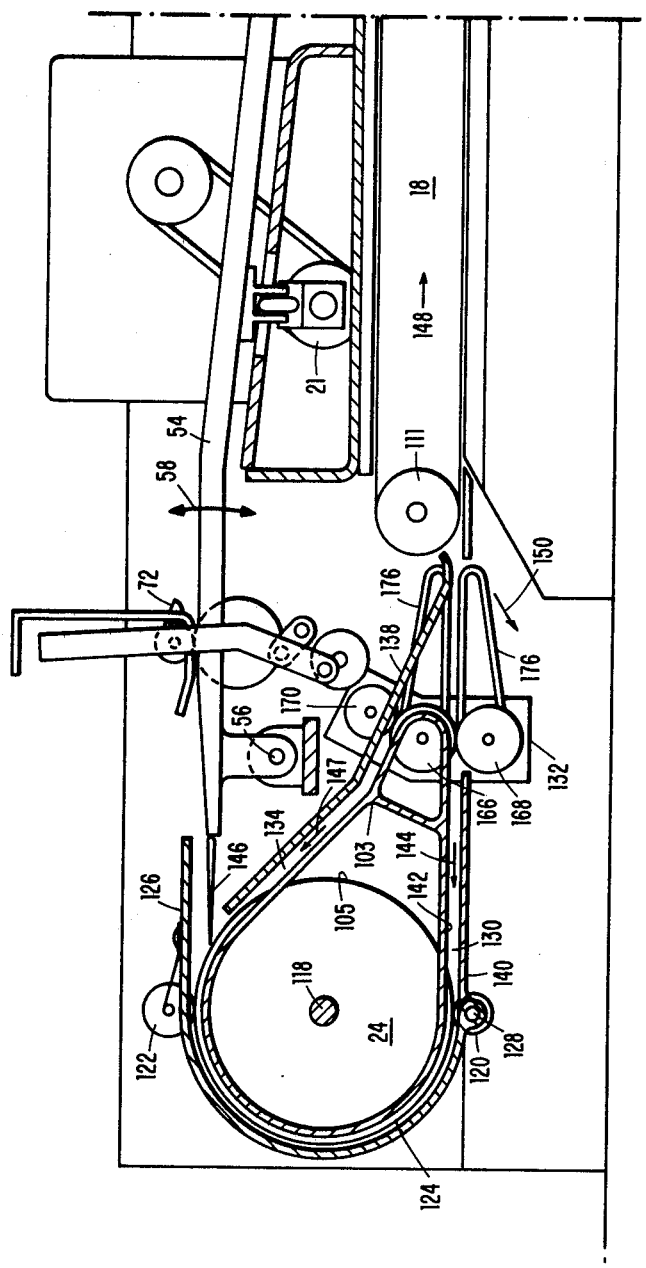
FIG. 2, comprised of FIGS. 2A and 2B, is a front cross-sectional view of the RADF.
Figure 3:
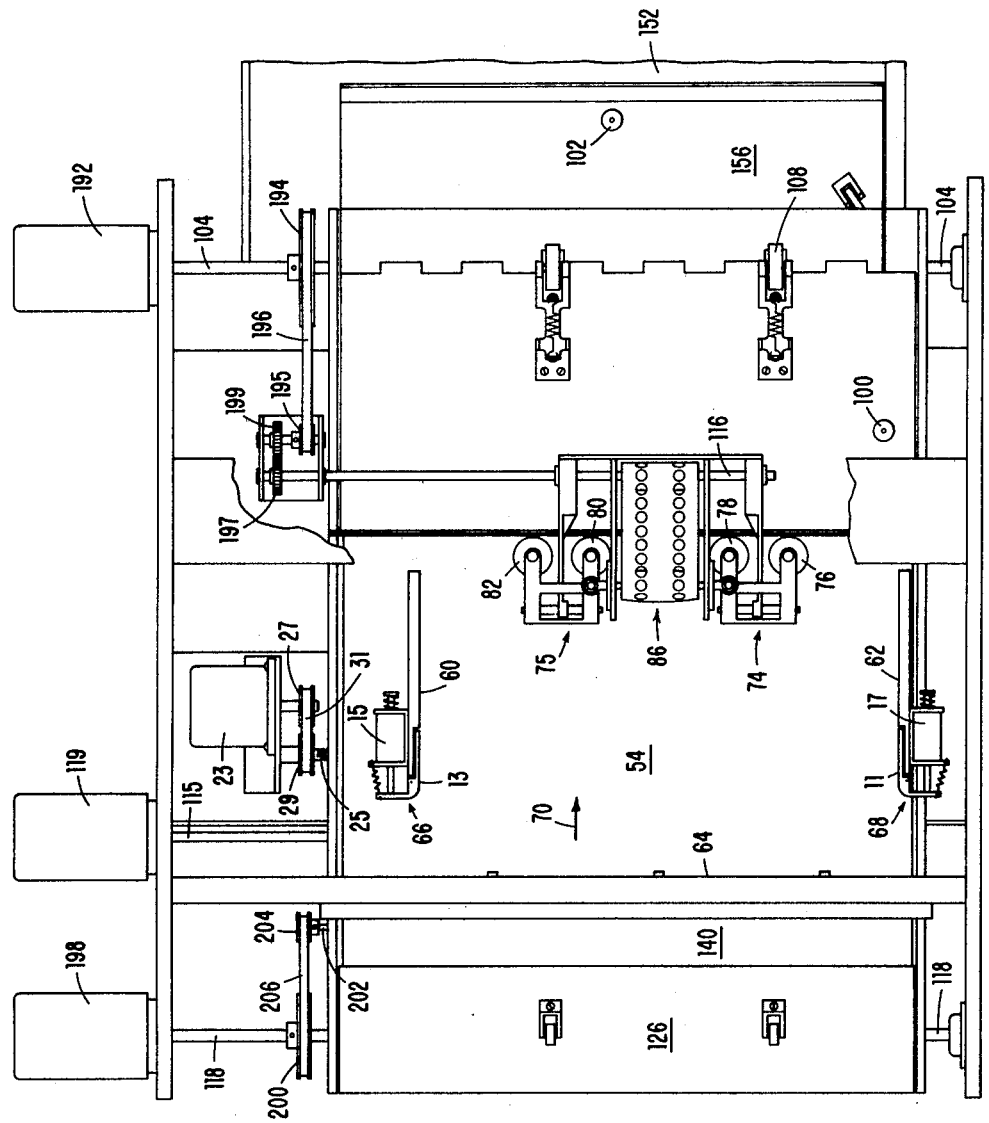
FIG. 3 is a top view of the RADF.

Referring now to FIGS. 2 and 3, a cross-sectional front elevational view and a top view of the RADF according to the teaching of the present invention, is shown. As was stated previously, the RADF is a self-contained unit or unified structure having a frame and a plurality of subassemblies which coact with each other to present and represent a sheet for copying on the document platen of a copier. In order to utilize the RADF, it is mounted by conventional means so that the platen transport means is disposed above and in close proximity to the document glass. However, for brevity of description, conventional elements such as the frame, covers and mechanisms for mounting the RADF to a copier are not disclosed. These elements are state of the art and can be easily designed by an artisan having ordinary skill in the mechanical art. Also, elements in FIGS. 2 and 3 which are identical to elements previously described in FIG. 1 will be identified by common numerals.

Referring now to FIGS. 2 and 3 simultaneously, a document support tray 16 is adapted to support a stack of original documents (not shown) to be copied. In placing documents in the tray, the documents are arranged in normal sequential order (that is page 1 of the document is on top with side 1 facing upwardly, page 2 and so on with the last page of the document at the bottom of the stack). The document tray has a bottom section identified by numeral 54. The bottom section is mounted to the frame of the RADF so that it pivots about pivot point 56 in the direction shown by double-headed arrow 58. As will be described subsequently, by mounting the bottom section of the tray so that it pivots, it adjusts the height of a stack of sheets (not shown) relative to the pick mechanism which separates sheets from the stack. A pair of side wall members 60 and 62, respectively, are fixedly coupled to the bottom section 54. The side wall members are disposed in spaced relationship and coupled to opposite sides of the bottom section. The side wall members extend upwardly from the bottom wall members. The spacing between the side wall members 60 and 62 define the maximum width of the document which the document support tray 16 can accommodate. A back wall member 64 is mounted to the back portion of document support tray 16. The bottom section of the document support tray slants toward back wall member 64. As such when a stack of sheets is loaded into the tray, the back edges of the sheets are aligned against back wall member 64.

For aligning the sheets on the side, a pair of side aligning members identified by numerals 11 and 13 are mounted relative to side wall members 60 and 62 respectively. Each of the side aligning members 11 and 13 are spring biased in a direction shown by arrow 66 and 68 respectively. Each of the side aligning members are coupled to an actuator. In the preferred embodiment of this invention the actuators are a pair of solenoids identified by numerals 15 and 17, respectively. Each solenoid is energized so that it forces the side aligning members into the path of a sheet traversing the paper path identified by numeral 70. When the solenoid is deactivated, the side aligning members retreat from the paper path to the normal home position. As sheets enter into the tray, the solenoids are deactivated and the side aligning members move outwardly away from the edge of incoming sheets. When the solenoids are activated, the side aligning members move inwardly toward the stack. As the aligning members move inwardly, they tap the incoming sheet on the side edge, thereby aligning the sheet with the stack. As such, a newly inserted sheet is properly aligned with the sheet already in the stack. Sheets entering the document support tray are restacked in the bottom of the stack and traverse along the paper path identified by arrow 70.

In order to lift the back edge of the sheet so that an incoming sheet can be restacked at the bottom of the stack, a four bar linkage mechanism including a kicker device 72 is disposed at the entry point to the bin. As a sheet is fully inserted in the bin, the mechanism is cycled and lifts the entire stack so that a new sheet can be inserted in the space generated between the stack and the bottom of the bin. A more detailed description of the four bar linkage mechanism is given in *IBM Technical Disclosure Bulletin* Vol. 23, No. 11, April 1981 (pgs. 4829–4831) entitled "Stack Support Mechanism." Also, a more detailed description of a top feed bottom stack device is given in the above-referenced Application, Ser. No. 056,170. This Application is assigned to the assignee of the present invention and is incorporated herein by reference.

Still referring to FIGS. 2 and 3 simultaneously, a picker mechanism identified by numeral 74 is disposed above the document support tray. The function of the picker mechanism is to descend downwardly into the document support bin 16 and pick sheets in seriatim from the top of a stack (not shown) positioned in the bin.

As is shown more clearly in FIG. 3, each of the picker mechanisms 74 and 75 includes a pair of vacuum picker boots identified by numerals 76, 78, 80 and 82, respectively. The picker mechanism is controlled so that it moves in a plane perpendicular to the bottom of the bin. The direction of movement is identified by double-headed arrow 84. A sheet transport mechanism 86 is disposed between the picker assembly 74 and 75 respectively. In operation, a sheet which is picked from the top of the stack is transported by the picker boots and delivered to the sheet transport means 86. In the preferred embodiment of this invention, the sheet transport mechanism and/or means is a vacuum type transport belt. The vacuum transport belt device includes a perforated belt rotating over a fixed plenum carrying negative pressure or vacuum. This type of device is well known in the prior art and details will not be given. A more detailed description of the picker mechanism is given in the above-referenced Application Ser. No. 175,172 entitled "Vacuum Document Feeder" assigned to the assignee of the present invention.

Figure 9:
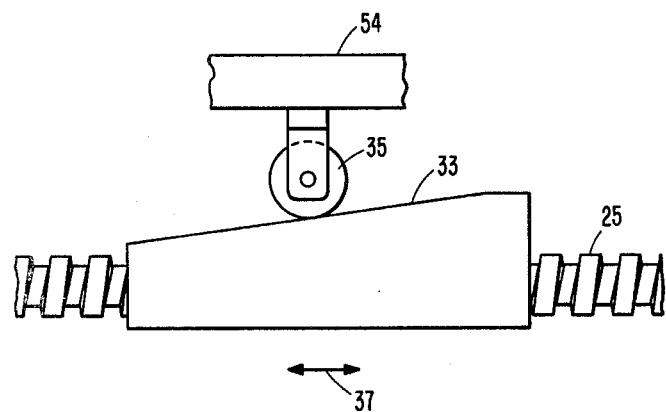
FIG. 9 shows a cross section of a device used to move the bottom of the RADF paper support tray.

As was stated previously, the bottom section 54 of support tray 16 pivots about pivot point 56. A motor drive means identified by numeral 21 drives the tray to enable pivoting about the pivot point. With reference to FIGS. 2, 3 and 9, the motor drive means includes a motor 33. The motor is coupled to lead screw 25 via pulleys 27 and 29 and drive belt 31. A block member 33 with an inclined camming surface is mounted on the lead screw. A cam follower 35 is coupled to the bottom section 54 of the tray. As the lead screw rotates, the block moves in the direction shown by double-headed arrow 37. Simultaneously the cam follower slides on the incline surface to adjust the bin bottom.

Still referring to FIGS. 2 and 3, a sheet guide channel 88 interconnects the sheet transport means 86 with an entry turnaround means 22. The sheet guide channel 88 includes a linear section which is oriented so that its center is substantially in linear alignment with the bottom surface of the transport belt of the sheet transport means 86. It also includes an arcuate section or channel which traverses the circumference of the entry turnaround means 22. The sheet guide channel 88 is formed by a lower guide member 90 which is fixedly coupled to an arcuate lower guide member 92. The upper portion of the channel is bounded by an upper guide member 94 and an arcuate upper guide member 96. The upper guide members 94 and 96 are coupled by hinge 98. The inner section of the arcuate channel is formed by the outer surface of the arcuate lower guide member 92. By hinging the upper guide member 94 and the upper arcuate guide member 96 at a common pivot point, should there be a paper jam in the guide channel 88, an operator can utilize handles 100 and 102 to lift the appropriate section and remove the paper.

The function of the entry turnaround means 22 is to transport the sheet which is delivered through the linear portion of the guide channel 88 so that it is delivered to the platen transport mechanism 18. It also flips (that is inverts) the sheet so that when the sheet emerges from the entry turnaround, side one which was facing upwardly in the document tray 16 now faces downwardly for copying on the document glass.

Figure 13:
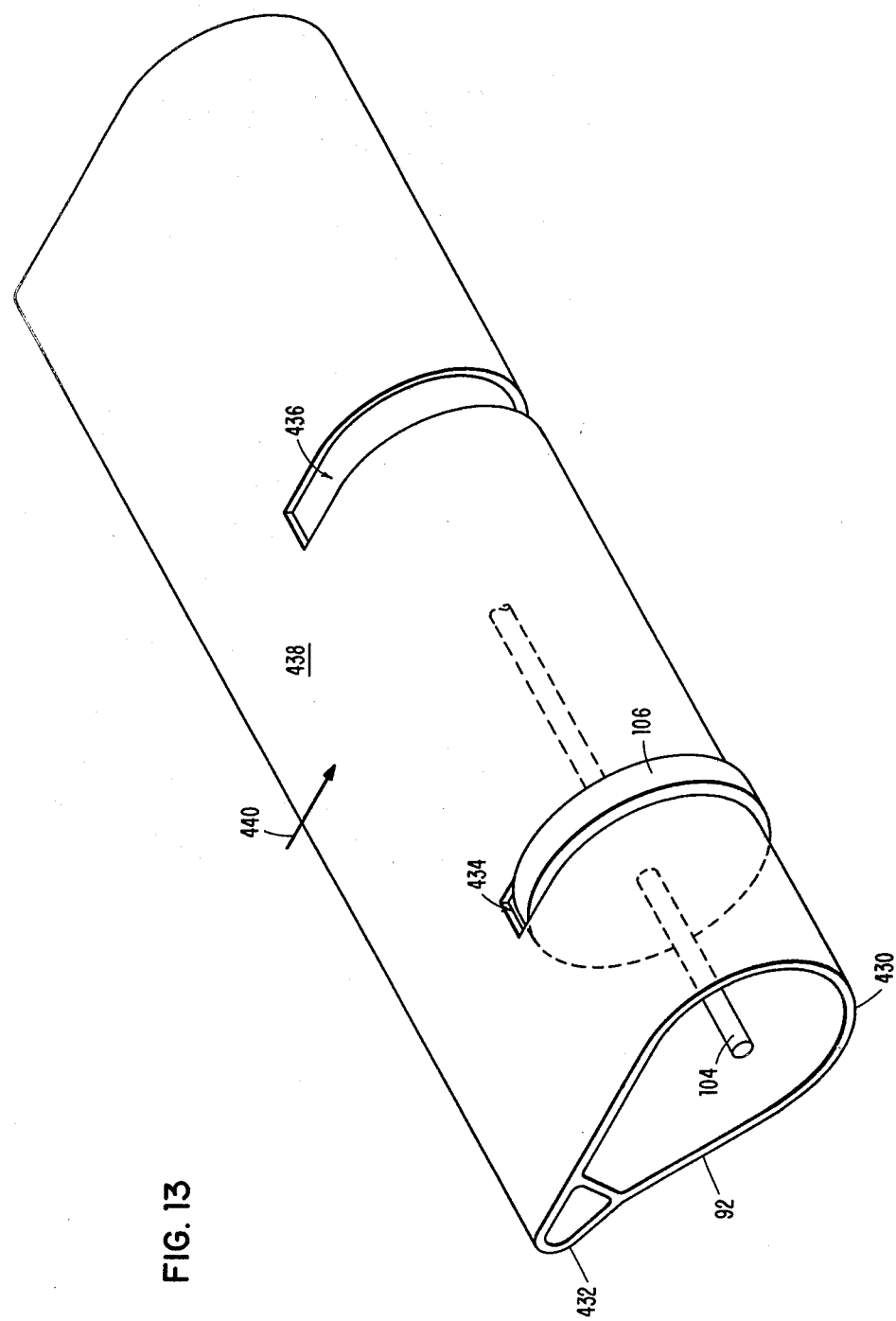
FIG. 13 shows a perspective view of the turnaround device used to invert a sheet.

Referring to FIGS. 2A, 2B and 13, the entry turnaround means includes the arcuate lower guide member 92. This guide member has a geometrical shape substantially equivalent to that of a pyramid. The cylindrical section 430 replaces the conventional rectangular section of the pyramid and a circular section 432 replaced the apex of the pyramid triangle. The guide member is preferably fabricated from extruded aluminum. A plurality of openings identified by numerals 434 and 436 are machined in the guide member. A shaft 104 is mounted within the cylindrical section of the guide member. A plurality of drive rollers, one of which is shown in FIG. 2 and identified by numeral 106, is fixedly mounted in spaced relationship on shaft 104. The outer surface of the drive rollers is slightly extended above guide surface 438 (FIG. 13). As such, a sheet which is traversing channel 88 (FIG. 2) in the direction shown by arrow 440 (FIG. 13) is driven through the turnaround by the drive rollers. A plurality of idler rollers, two of which are shown in FIG. 2 and identified by numerals 108 and 110 respectively, are disposed about the circumference of the drive rollers and along the longitudinal axis of shaft 104. In the circumferential dimension, the guide rollers such as 108 and 110 are disposed approximately 180° apart. Along the longitudinal dimension of shaft 104, the spacing between the idler rollers is substantially equivalent to the spacing between opening 434 and opening 436.

The idler rollers coact with the drive rollers to form drive nip for sheets which are picked from a stack in supply tray 16 and must be transferred to the platen transport means 18 for copying on the document glass. As will be described subsequently, the entry turnaround means 22 is independently driven by a servo-controlled motor and an independent servo-controlled loop. A transmission system (to be described later) couples shaft 104 to the drive roller shaft 116 of sheet transport means 86. With this configuration, a single motor drives the entry turnaround means 22 and the sheet transport means 86. However, the coupling is such that shaft 104 and the drive rollers attached thereto rotate in the direction shown by arrow 112 (FIG. 2) while the undersurface of the vacuum transport belt 87 associated with sheet transport means 86 travels in the direction shown by arrow 114. As such, whenever a sheet (not shown) is inverted and is delivered to the platen transport means 18, a sheet which is attached to the undersurface of the belt on document transport 86 is loaded into the entry turnaround means 22.

Still referring to FIGS. 2A, 2B and 3, another independently servo-controlled element of the present RADF is the platen transport means 18. This platen transport means 18 accepts a sheet from the entry turnaround means 22 and registers the sheet at the document platen where the sheet is exposed and a latent image of the informational contents is formed on the photoconductor of the copier. The platen transport means 18 is disposed above the document glass and in close proximity thereto. By positioning the platen transport means 18 immediately below the document support tray 16, a relatively compact RADF is obtained. Although it is within the skill of the art to fabricate a plurality of different types of platen transport means such as feed wheels, etc., in the preferred embodiment of this invention, the document is positioned on the glass of the copier by a vacuum transport belt device. The vacuum transport belt device includes a drive roller 111 disposed in spaced relationship to an idler roller 113. A vacuum plenum (not shown) is disposed between the rollers and a perforated endless belt is disposed to be transported about the rollers. This type of vacuum transport device is well known in the prior art and as such, details of its construction will not be given. The vacuum transport belt coacts with a sensor means 386 (FIG. 10) disposed within the vicinity of drive roller 111. The transport belt and the sensor coact to align the sheet for copying on the document glass. A more detailed description of the coaction between the sensor and the vacuum transport belt is given in Application Ser. No. 262,727 entitled "Document Feeder Electronic Registration Gate" and assigned to the assignee of the present invention. The drive roller 111 is coupled to shaft 115. The shaft and hence the belt is driven by a servo-controlled motor which is independently controlled so that it accepts sheets from entry turnaround 22, registers the same for copying on the document glass and then delivers the sheet to the exit turnaround means 24.

The other functional element of the RADF is the exit turnaround means 24 (FIGS. 2 and 3). The exit turnaround means 24 is substantially identical to the elements of the entry turnaround means 22. Entry turnaround means 22 is fully described above. As such, the details of the exit turnaround means 24 will not be given. However, the important elements associated with the turnaround will be enumerated to the extent that it is necessary to describe the present invention. The exit turnaround means 24 includes a pyramidally-shaped member 103 disposed about shaft 118. A plurality of drive rollers are mounted to the shaft. One of the drive rollers is identified by numeral 105 (FIG. 2). A plurality of back-up rollers, such as 120 and 122, coact with the drive rollers to form sheet transport nip through which a sheet is transported. An arcuate sheet conveyance channel 124 is disposed or formed about the periphery of the drive rollers and the cylindrical section of the pyramidally-shaped member 103. The outer portion of the sheet conveyance channel 124 is formed by an arcuate member 126 which is pivotably mounted to hinge 128. A linear sheet conveying channel 130 to receive simplex sheets and deliver duplex sheets interconnects with the arcuate sheet conveying channel 124. The linear sheet conveying channel 130 is coupled by a gate assembly means identified by numeral 132 to accept a sheet as it is forced from the undersurface of the platen vacuum transport belt. As will be explained subsequently, the gating assembly 132 operates to direct a sheet along a simplex path which is formed by the linear sheet conveying channel 130 and the arcuate sheet conveying channel 124 or along the duplex sheet conveying channel 134. The duplex sheet conveying channel 134 is formed by side members 138 and 103. Likewise, the linear sheet conveying channel 130 is formed by movable side member 140 and surface 142. It should be noted that if a sheet is stuck about the exit entry means 24, arcuate side members 126 and linear side members 140 can be pivoted about hinge 128 to remove the paper jam.

Another important feature of the present invention is the fact that a single or common turnaround means 24 coacts with a gating mechanism means 132 to flip simplex or duplex originals. This feature is a feature which is not present in the prior art. To this end, when a simplex original (that is a sheet having readable information on one side only) is copied on the document platen, the gating mechanism is positioned to form a simplex paper path which is identified by arrow 144. A simplex sheet moving in the direction identified by arrow 144 is forced to traverse the sheet conveying channel 124 in a clockwise direction and is transported over passive gating assembly 146 through an exit channel to the input station of the support tray 16 where it is restacked in its proper orientation with side one facing upwardly. However, if the document which is positioned on the document glass by document platen positioning means 18 is a duplex document (that is it has information on both sides), after side one of the sheet is copied, the gating assembly 132 is repositioned so that the sheet traverses duplex sheet conveying path 134 in the direction shown by arrow 147. The leading edge of the sheet (not shown) lifts passive gate 146 and is forced to traverse the sheet conveying channel 124 in a counter-clockwise direction. By traversing the arcuate path about the exit turnaround means 24, the sheet is flipped and is conveyed along the simplex path where it is repositioned, by the platen vacuum transport belt, for copying on the document platen. In order to reposition the sheet for side two copying, the belt travels in the direction shown by arrow 148. Of course, the belt is driven bidirectionally and as such, can move in the direction opposite to arrow 148. After side two of the document sheet (not shown) is copied, the sheet is forced to follow the duplex path 134 and is partially bent around the turnaround means 24. After the trailing edge of the sheet clears the gate 146, the roller means is rotated again in a clockwise direction and the sheet is driven through the exit channel into the document support tray 16 with side one facing upwardly and side two facing downwardly. In order to transport sheets clockwise and counterclockwise around the exit turnaround means 24, the turnaround means is driven bidirectionally.

The document handler of the present invention also includes a semiautomatic document feed (SADF) paper path. The SADF paper path allows an operator to interrupt the normal operation of the RADF and insert a sheet or a series of sheets which are driven by feed rollers 106 and back-up roller 110 (FIGS. 2 and 3) onto the vacuum belt of the platen transportation means 18 where it is registered on the document glass for copying and is then deflected along the SADF exist path indicated by arrow 150 into an original document exit tray 40 (FIG. 1).

The SADF paper path includes a document receiving tray 152 which is coupled to the entry turnaround means 22 by a paper guide channel identified by numeral 154. The paper guide channel 154 is formed by the bottom section on entry tray 152 and an upper guide member 156. As is seen in FIG. 2, upper guide member 156 is rigidly coupled to arcuate section 96. As such, should a paper jam occur with the channel 154, an operator can open the channel by lifting the upper guide member 156 which pivots about pivot point 98. A feed mechanism comprising a feed roller 158 and a back-up or idler roller 160 is disposed so that their outer periphery forms a feed nip within the paper guide channel 154. A gate assembly 162 is disposed downstream from the feed and back-up rollers 158 and 160, respectively. The gating assembly moves in the direction shown by arrow 161.

In operation, an operator feeds the sheet along paper guide channel 154 in the direction shown by arrow 164. The paper is forced by hand until the leading edge is picked by feed rollers 158 and 160. The feed rollers then automatically feed the paper until the leading edge is registered against gate 162. At this point the sheet is under the control of the copying system. The copier controller then interrupts RADF action, and at the proper time, the gate is automatically lowered and the sheet is fed until it is contacted by feed roller 106 and back-up roller 110. The sheet is then fed until it is picked up by platen transport means 18. At this point it is registered on the document glass, copied and then fed off the document glass by the platen transport means 18. As the sheet leaves the platen transport means, the controller system repositions the gating mechanism 132 so that the sheet is deflected along a relatively straight path. It should be noted that the SADF paper path is relatively straight and is disposed outside of the simplex or duplex paper path. Due to the fact that the paper path is straight, the potential for paper jam is significantly reduced.

To summarize the operation of the gate assembly means 132, observe that it is controlled so that (1) a sheet is diverted along a simplex path where it is flipped by the exit turnaround means 24 and is restacked in the document support tray 16 with side one facing upwardly; (2) the gate assembly means is positioned so that a duplex original traverses the duplex path, flips (that is inverted) by exit turnaround means 24 and is repositioned on the document platen for side two copying; (3) after side two copying, the gating assembly means maintains its duplex orientation and the sheet is transported for a second time along the duplex path. However, the sheet is transported partially around the exit turnaround means 24, preferably in a counterclockwise direction. The sheet is then fed in a clockwise direction where it is restacked in document support tray 16 with the odd side (that is side one) of the document facing upwardly; (4) for the SADF paper path, the gate is repositioned so that the sheet travels along the direction indicated by arrow 150 into the exit paper tray. As such, the gating mechanism 132 is controlled to create three independent paper paths, each one of which is selected by the characteristic of the original document.

Figure 8:
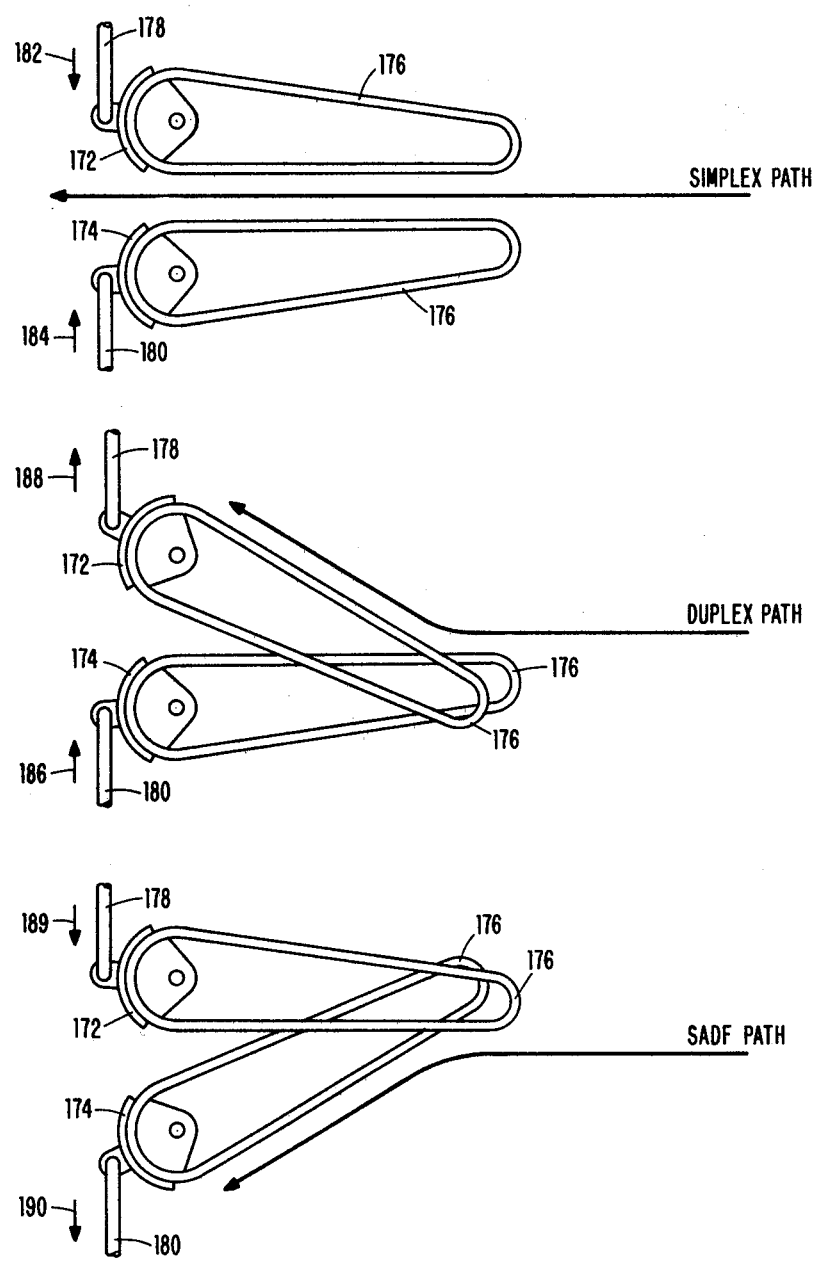
FIG. 8 shows the orientation of the linkage mechanism which forces a sheet to traverse one of three paths.

The gating mechanism means 132 includes a drive roller 166 and a plurality of back-up rollers 168 and 170, respectively. The back-up rollers are disposed on opposite sides of the drive roller 166 to form a pair of oppositely disposed drive nips. The oppositely disposed drive nips are disposed so that one is disposed to feed a sheet traversing the duplex path and the other is disposed to feed a sheet traversing the simplex path. A linkage mechanism including an arcuate cylindrical member 172 and 174 (FIG. 8) is disposed about feed roller 166 and lower back-up roller 168 (FIG. 2). A plurality of wire forms identified by numeral 176 are disposed in spaced relationship along the longitudinal axis of the arcuate members. A drive solenoid (not shown) is coupled by shaft 178 and 180, respectively, to each of the arcuate members. To this end, in order to configure the wire forms to form a gate to direct a simplex, duplex or SADF copy, the solenoid is activated through the controller associated with the document handler and the wire forms are positioned in the appropriate position. The drive roller 166 is then activated and a sheet which is deflected along the selected path is driven by the drive roller and the associated back-up roller to traverse the exit turnaround means 24 or to enter into the original document exit tray. The orientation of the gating assembly in FIG. 2 shows the gate configured for a sheet to traverse a simplex path. FIG. 8 shows sketches of the gating assembly for simplex, duplex and SADF path operations. The topmost sketch shows simplex positioning, the center sketch shows duplex positioning and the lowermost sketch shows SADF positioning. For simplex positioning identified by the topmost sketch, the solenoids (not shown) are both activated so that their force of action is active in the direction shown by arrows 182 and 184, respectively. As such, the linkage mechanism associated with the feed roller 166 and the linkage mechanism associated with the lower back-up roller 168 move the wire form to generate a simplex path as is shown in the sketch.

For duplex path configuration (shown by the center sketch in FIG. 8), the solenoid which is associated with shaft 180 of the linkage mechanism is energized to act in the direction shown by arrow 186. Simultaneously, the solenoid which is associated with shaft 178 is deenergized and an associated spring return means (not shown) exerts a force on shaft 178 in the direction shown by 188. As such, the wire forms associated with the linkage mechanism move downwardly as is shown by the sketch, and sheets which are exiting from the platen transport means traverse the duplex path. As is vident from the sketch, the direction of travel in the duplex path is identified by the arrow.

For SADF path orientation, the solenoid associated with shaft 178 is energized so that it acts in the direction shown by arrow 189. Simultaneously therewith, the solenoid associated with shaft 180 is deenergized and the spring (not shown) exerts a force on shaft 180 in the direction shown by arrow 190. As such, the linkage mechanism and the wire forms coupled thereto are disposed in the configuration shown in the lowermost sketch of FIG. 8. In this configuration the sheet outputted from the platen transport means traverses the SADF paper path.

As was described previously, each of the functional paper transport elements of the present RADF is driven by an independently controlled servomotor. With reference to FIG. 2, the platen transport means 18 is one of the independently controlled servo elements of the present invention. The platen mechanism is a vacuum transport mechanism including a transport belt 191 coupled to a drive roller 111 and an idler roller 113. The drive roller 111 is coupled to shaft 115. The shaft 115 is driven by servo-controlled motor 119 (FIG. 3).

FIG. 3 also shows the drive mechanism for the entry turnaround means 22 (FIG. 2) and the exit turnaround means 34 (FIG. 2). As can be seen in FIG. 3, shaft 104 is coupled to an entry turnaround motor 192. A pulley 194 is fixedly mounted to shaft 104. The pulley 194 is coupled through drive belt 196 and a transmission means 195 to shaft 116 of the sheet transport means 86. In the preferred embodiment of this invention, the transmission means includes a pair of drive gears identified by numerals 197 and 199. Of course, other types of transmissions can be used without departing from the scope of the present invention.

As can be seen from FIGS. 2 and 3, the sheet transport means 86 is driven by the entry turnaround motor 192 and the mechanisms interconnecting the drive motor with the sheet transport means 86. As such, as the entry turnaround motor rotates in a clockwise direction to transport a sheet through the arcuate paper path associated therewith, a sheet which is attached to the undersurface of the transport belt associated with the sheet transport means 86 is moved in the direction shown by arrow 114 (FIG. 2). Stated another way, the coupling between the entry turnaround means 22 and the vacuum transport belt which is associated with document transport means 86 is such that when the entry turnaround means rotates in a clockwise direction, the lower run of the vacuum transport belt moves in a left-to-right direction to drive a sheet into the turnaround.

Likewise, the shaft 118 of the exit turnaround means 24 is coupled to an exit turnaround motor 198. The exit turnaround motor 198 drives the exit turnaround means 24 bidirectionally. This is necessary so that sheets can traverse the path bidirectionally depending on whether a simplex original or a duplex original is processed. A pulley 200 is fixedly mounted to shaft 118. Drive roller 166 (FIG. 2) is coupled to drive shaft 202. A pulley 204 is mounted to drive shaft 202. An endless belt 206 couples pulleys 200 and 204. With the drive mechanism configured in the above-described manner, whenever the exit turnaround motor 198 drives the exit turnaround in a clockwise or counterclockwise direction, the drive roller 166 which drives the sheet through the gate assembly means 132, is driven in the same direction. This completes the description of the mechanical components of the present invention.

The Controller and Electrical System

Figure 4:
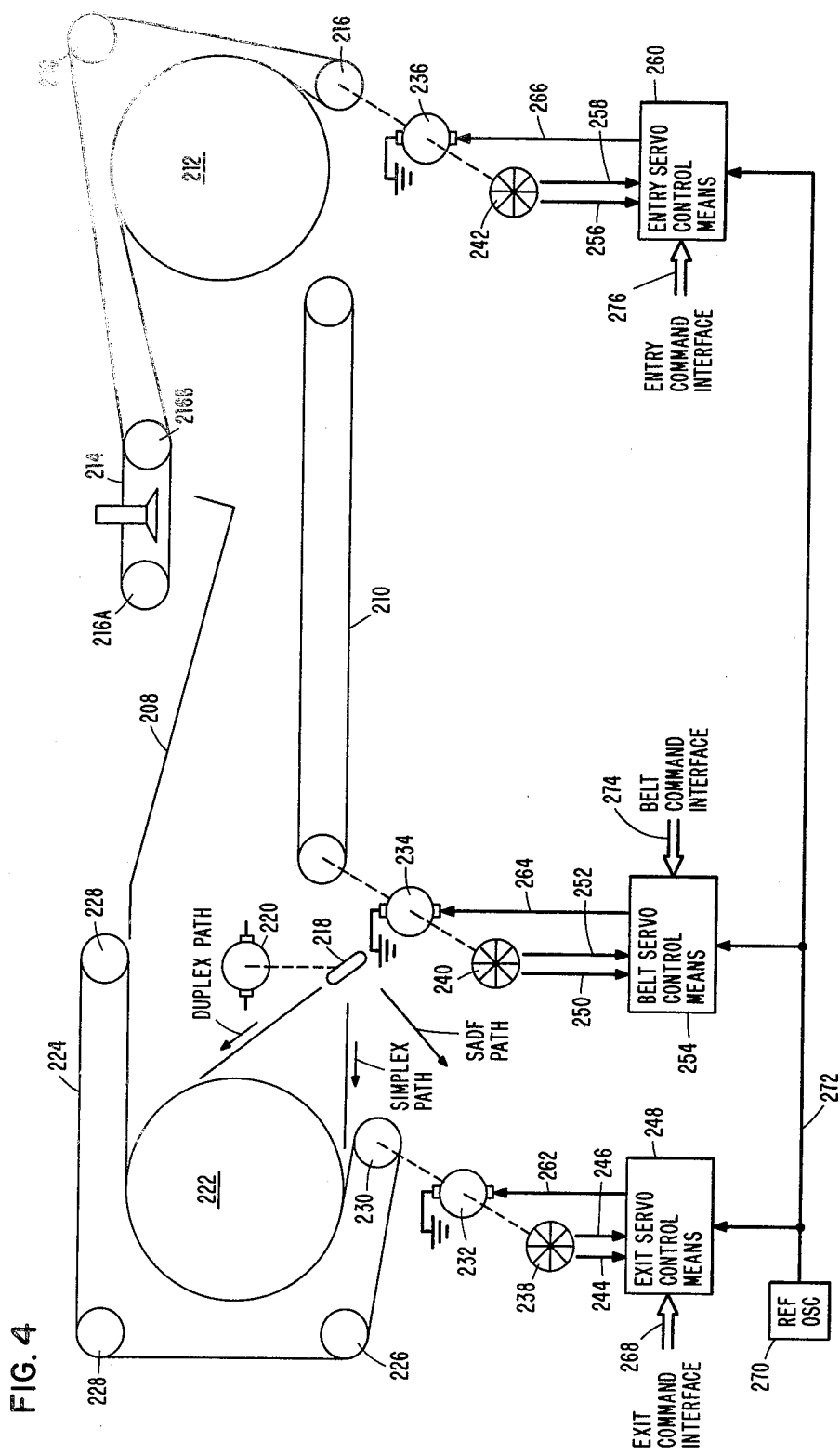
FIG. 4 shows a block diagram of the functional elements of the RADF according to the teaching of the present invention.

Referring to FIG. 4, a block diagram of the functional elements of the document handler and the servo-controlled loop which drives each element is shown. It should also be noted that the paper transport mechanism in the sketch is an alternate embodiment. Although the functional elements are identical to the functional elements of the preferred embodiment of the document handler previously described, the mechanical elements of the alternate embodiment are somewhat different. Therefore, the numerals used to identify each mechanical element will be different. To this end, the paper tray 208 is disposed in a vertical plane above the vacuum transport belt 210. The entry turnaround means 212 includes a cylindrical member with its longitudinal axis running traverse to the direction of sheet travel. A continuous picker vacuum belt 214 is mounted on a plurality of pulleys 216. The pulleys are appropriately mounted so that the belt coacts with the periphery of the cylindrical member to form a feed nip.

Similarly, in the area between pulleys 216a and 216b, a vacuum plenum is disposed. As such, the topmost sheet is picked by the picker vacuum foot and delivered to the undersurface of the picker vacuum belt 214. The picked sheet is transported between the nip formed by the cylindrical member and the arcuate section of the picker vacuum belt 214. The picked sheet is then delivered to platen transport (XPORT) belt 210 where it is positioned for exposure. The XPORT belt 210 is substantially equivalent to that previously described and therefore its description will not be repeated here.

Disposed downstream from the transport belt 210 is a gating assembly 218 coupled to a gate motor 220. The gate motor 220 positions gating means 218 so that a sheet is forced to traverse the duplex path, the simplex path or the SADF path.

The exit turnaround means 222 is formed by a cylindrical member coacting with an endless belt 224 to form a feed nip through which sheets are conveyed bidirectionally. The endless belt 224 is supported by a plurality of idler rollers 226, 228 and a drive roller 230.

Before addressing the electrical aspect of the invention, it should be noted that whereas the paper transport mechanism at the entry and exit turnaround of the alternate embodiment of FIG. 4 is different from the paper transport mechanism of the preferred embodiment previously described, the controller and electronics which are used for driving either the configuration in FIG. 4 or the configuration of the previously preferred described embodiment is identical and as such will be described in accordance with the alternate embodiment only, it being understood that the controller also applies to the mechanical configuration of the preferred embodiment shown and described in FIGS. 2 and 3. Each of the functional elements or individual transports of the present invention, is driven by identical but separate servo-controlled motors identified by numerals 232, 234 and 236 (FIG. 4). With reference to the preferred embodiment of FIGS. 2 and 3, the servo-controlled motors are identified by numerals 119, 192 and 198.

Referring now to FIG. 4, separate but identical two-phase tachometers identified by numerals 238, 240 and 242 are mounted to the shaft of the load.

The function of each of the two-phase tachs is to give information relative to direction of rotation and angular distance traveled by the load shaft. The signals outputted from tach 238 are fed along conductors 244 and 246 into exit servo-control means 248. Likewise, the signals outputted from tachometer 240 are fed along conductors 250 and 252 into belt servo-control means 254. Likewise the signals outputted from tachometer 242 are fed over conductors 256 and 258 into entry servo-control means 260. Feed forward current signals for driving the motors are outputted on conductors 262, 264 and 266, respectively. The function of the exit servo-control means 248 is to accept exit command interface signals generated by a master controller which will be described shortly, on the exit command interface line 268. The signals are combined with feedback signals on conductors 244 and 246 and reference signals generated by reference oscillator 270 and outputted on conductor 272 and form a series of control pulses for driving the exit turnaround assembly.

Similarly, belt servo-control means 254 accepts belt command interface signals on the belt command interface line 274 and reference signals on conductor 272 and generate control signals for driving the transport belt motor. Likewise, the entry servo-control means 260 processes signals outputted on conductors 272, 256 and 258 with signals generated on the entry command interface line 276 and outputs control signals for driving the entry turnaround motor. As is obvious from FIG. 4, each of the motors are driven by a closed-loop servo comprised of a servo-control means with reference signals inputted from a common reference oscillator 270 and control signals generated from a master controller. The signals generated on the various interfaces by the master controller are signals necessary for the proper operation of the particular portion of the RADF. The electrical circuit which is associated with this servo-control means which forms part of the closed-loop servo are identical and as such, only one will be described, it being understood that the others are identical.

Figure 5:
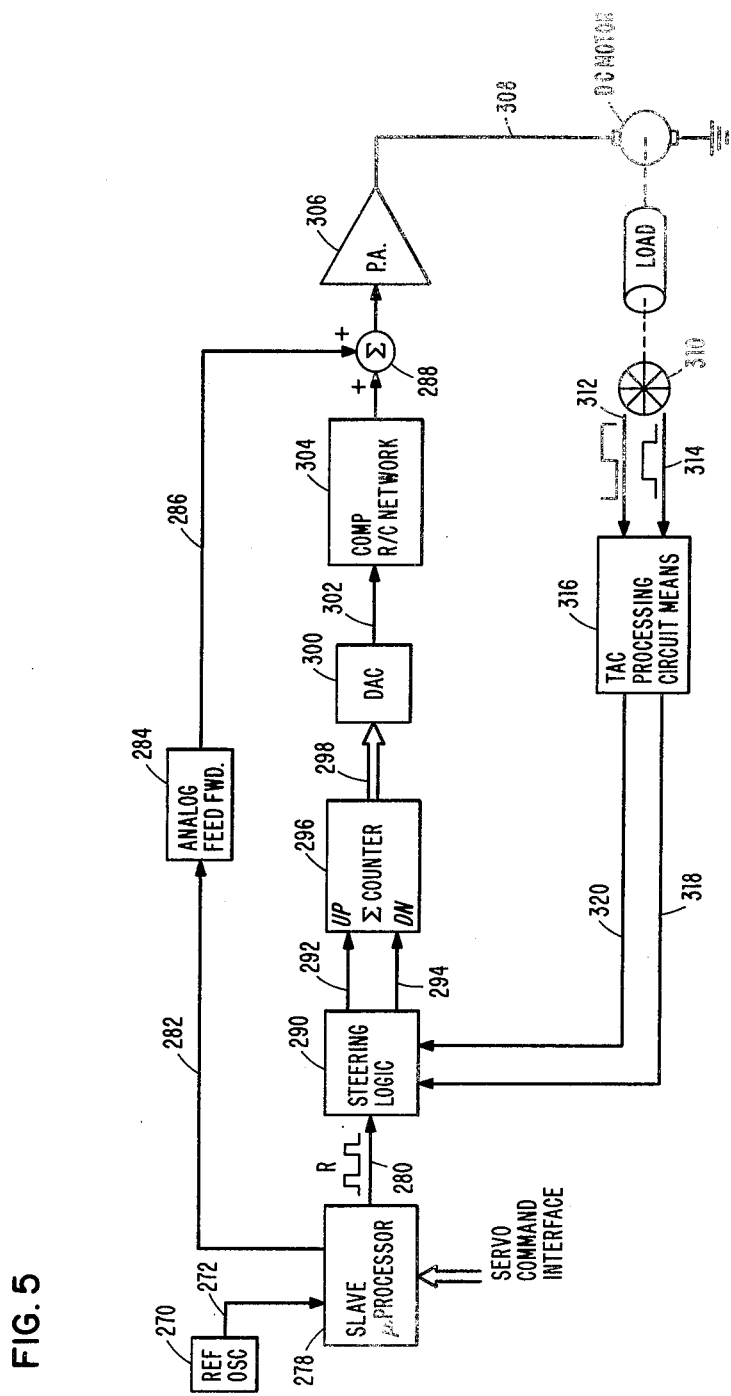
FIG. 5 shows a closed-loop servo for driving the functional elements of FIG. 4.

FIG. 5 shows a block diagram of a closed-loop servo adaptable for driving any one of the functional elements of the RADF according to the teaching of the present invention. The functional elements include the picker mechanism with sheet transport and entry turnaround, the platen transport mechanism and the exit turnaround. The servo loop includes the reference oscillator 270 which generates signals on conductor 272. The signal on conductor 272 is fed into a signal processing circuit means 278. In the preferred embodiment of this invention, the signal processing means 278 includes a microcomputer. The function of the microcomputer is to generate reference signal R on conductor 280 and generate feed forward control signals on conductor 282. The signals on conductor 282 are fed into analog feed forward circuit means 284. The output from the analog feed forward (FWD) circuit means 284 is fed over conductor 286 to an algebraic summing means 288. Control signals from the servo command interface are also inputted into the signal processing means 278. The other input signal to summing circuit means 288 is generated by the closed loop of the servo. The feed forward loop is comprised of signals generated from steering logic circuit means 290 coupled by conductors 292 and 294 to up/down counting means 296. The output from the up/down counting means 296 is fed over conductor 298 into a digital-to-analog converter (DAC) 300 where it is fed over conductor 302 into a compensating (COMP) R/C network 304. The output signal from the summing circuit means 288 is fed into power amplifier 306. The amplified signal is then fed over conductor 308 to drive one of the DC motors. As was stated before, the DC motor is coupled to a shaft load. The load represents one of the functional elements of the RADF. By way of example, the load can be the platen vacuum transport mechanism or the entry turnaround or the exit turnaround.

In order to keep track of the position of the load, a two-phase tach identified by numeral 310 is coupled to the load. The tach outputs two sets of pulses; one on conductor 312 and the other on conductor 314. The signals are processed by tach processing circuit means 316 which outputs backward pulses and forward pulses on conductors 318 and 320, respectively. Tach processing circuit means are well known in the prior art and can be of the type described in *IBM Technical Disclosure Bulletin* Vol. 14, No. 12, May 1972 (pgs. 3672-3673) entitled "Logical Motion and Direction Detection."

The servo loop described above is designed as a position servo loop. The position of the motion elements (that is the element being moved) are matched to a predetermined position reference. Once this is accomplished, the dynamics of all the parts are well controlled. To this end, a digital position reference "R" is generated by way of the common reference oscillator 270 and the microcomputer 278 (FIG. 5). The digital position reference (R) is a series of time-modulated pulses generated to correspond to the time function of the desired position trajectory. Each reference pulse is essentially a command to the servo loop to move the load one tach pulse.

Servo loop error is generated via the up/down counter 296. The up/down counter performs the function "R-X" (with X being derived from the tachometer feedback signals). The digital error is converted to an analog signal by DAC 300. The DAC, in turn, drives power amplifier 306 to provide current to the DC motor. Feed forward signals generated by analog feed forward means 284 are also injected into the power amplifier to provide nominal current calculated to drive the motor/load for the desired trajectory. Thus the servo loop acts as a vernier control system while the feed forward means 284 provides the major portion of the required drive current.

Figure 6:
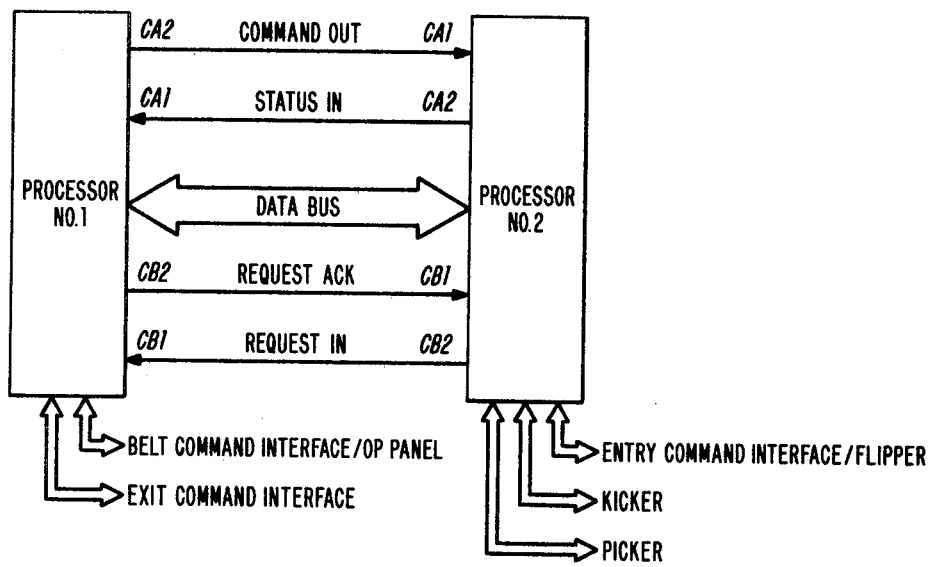
FIG. 6 shows the controller for the RADF. The controller includes a pair of microprocessors coupled in a master/slave configuration.
Figure 7:
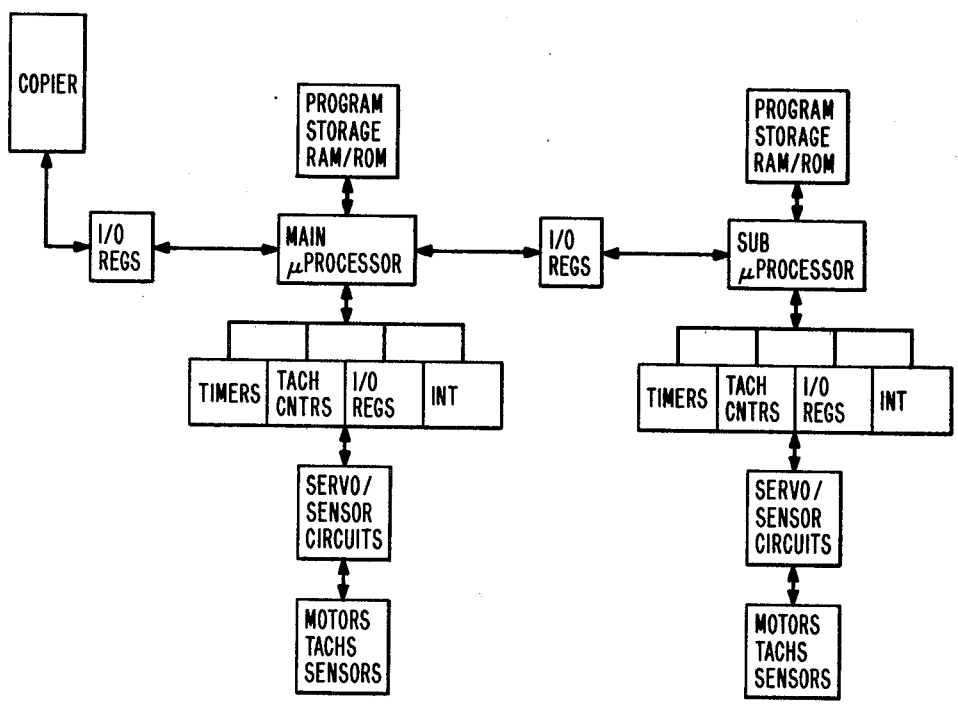
FIG. 7 shows a block diagram of the functional elements of the controller and its connection with the copier/RADF.

FIGS. 6 and 7 show block diagram schematics of the main controller used to control the RADF and an associated convenience copier. The main controller for the recirculating automatic document feed of the present invention is a pair of microprocessors coupled in a master/slave configuration shown in FIGS. 6 and 7. It should be noted that a single microprocessor having enough processing power can perform the control functions of the main microprocessor (Processor #1), the slave microprocessor (Processor #2) and other microprocessors dedicated to perform particular functions in each of the servo loops.

In the configuration shown in FIG. 6, processor 1 executes the main stream microcode program for RADF operation while processor 2 receives commands from processor 1 and executes them. In the preferred embodiment of this invention both processors 1 and 2 are the so-called 6502 microprocessor manufactured by MOS Technology Inc. Of course any other type of conventional processor can be utilized for performing the necessary controls. By way of example, processor 1 performs the exit turnaround command function. This command is outputted on the exit command interface line which is interconnected to the appropriate servo loop.

Likewise, interface command for the platen transport means and the operator (OP) panel is generated by the processor 1. These signals are outputted on the belt command interface line. Likewise, commands for the vacuum picker assembly, the kicker, the entry turn-around command interface and the picker (elements 74, 72, etc., FIGS. 2 and 3) are generated by processor 2.

The processors communicate through memory addressable I/O registers (FIG. 7). The interface contains one 8-bit bidirectional data buss and four tag lines (FIG. 6). The commands are transferred to processor 2 using the "Command Out Line." Processor 2 acceptance is acknowledged with a response on "Status In Line." Processor 2 then disconnects from the interface and executes the command. When the command has been executed, processor 2 interrupts processor 1 via the "Request In" line. At this point in time, processor 1 sends back "Request Acknowledged" (ACK) indicating it is ready to accept status bytes. The two final status bytes are now sent to processor 1; the first indicating the command executed, and the second indicating status (that is successful, error, etc.). Processor 1 keeps track of each command issued and completed via a "Device End Register." Each time a particular command is sent to Processor 2, the associated device and the bit is zeroed out. The bit is set to logical 1 when ending status is received for that particular command.

Whereas FIG. 6 shows microprocessor-to-microprocessor interconnection, FIG. 7 shows microprocessor-to-hardware interconnection. As can be seen in FIG. 7, each processor has its own memory and memory address buss. In addition to the program memory, each processor communicates with various subsystems of the RADF through logic I/O registers. The registers are addressed as memories and are used to read in the status of the various sensors as well as turn control lines on and off. By way of example the sensors can be servo/sensor circuits (SERVO/SNSR CKTS) and/or motor tach sensors (FIG. 7). Of course, the (slave processor) monitors sensors associated with the device it controls. The control lines interfacing the processor have already been described in reference to FIG. 6.

Still referring to FIG. 7, each processor has access to a number of hardware counters which can be read from or written into. These counters are used as timers in some instances, to time discrete operations such as a pick operation and also as a tachometer counter and/or timer to check that routines are completed. The counters are also used to count tachometer pulses from each of the three previously described servo systems. These counters are used for positional information input to check the progress of the documents through the RADF and also to turn certain controls on and off. The block diagram in FIG. 7 shows various RADF electrical subsystems which are interfaced with the processor. By way of example, both the main and the submicroprocessor interface with a plurality of timers, tachometer timers, I/O registers and interrupt (INT) control lines. These facilities, in turn, interface with physical servo sense circuits which are the servos used to drive the functional elements of the RADF and the sense circuits used for sensing paper position in the RADF. Also, motors, tachometers and sensors are coupled to the various microprocessors.

Similarly, the RADF communicates with the copier through processor 1 (the main processor) which is coupled through a series of I/O registers to the copier. The RADF through the microprocessor receives job commands and parameters from the copier, executes them and then passes completion and error status back to the copier. In addition, diagnostic commands are also sent to the RADF and diagnostic sensed data is sent to the copier. The type of information which the copier loads into the I/O register includes, but is not limited to, the type of original documents, simplex or duplex. This information would be inputted from the operator control panel which is associated with the copier, also the number of times a sheet should be circulated, etc. It should be noted that the information can be inputted from a dedicated RADF panel.

Figure 11A:
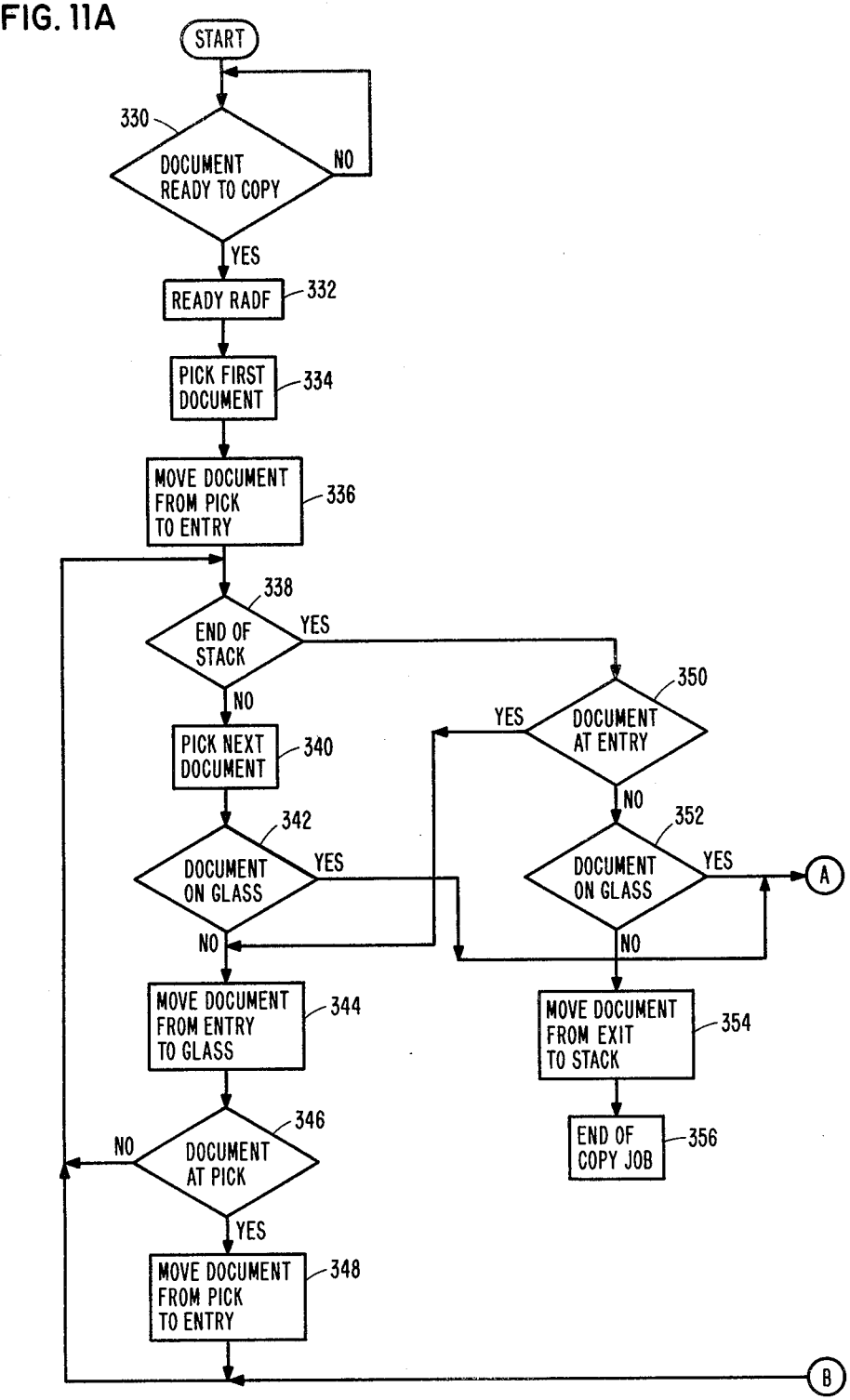
FIGS. 11A and 11B show a flowchart of the program for the microprocessor.
Figure 11B:
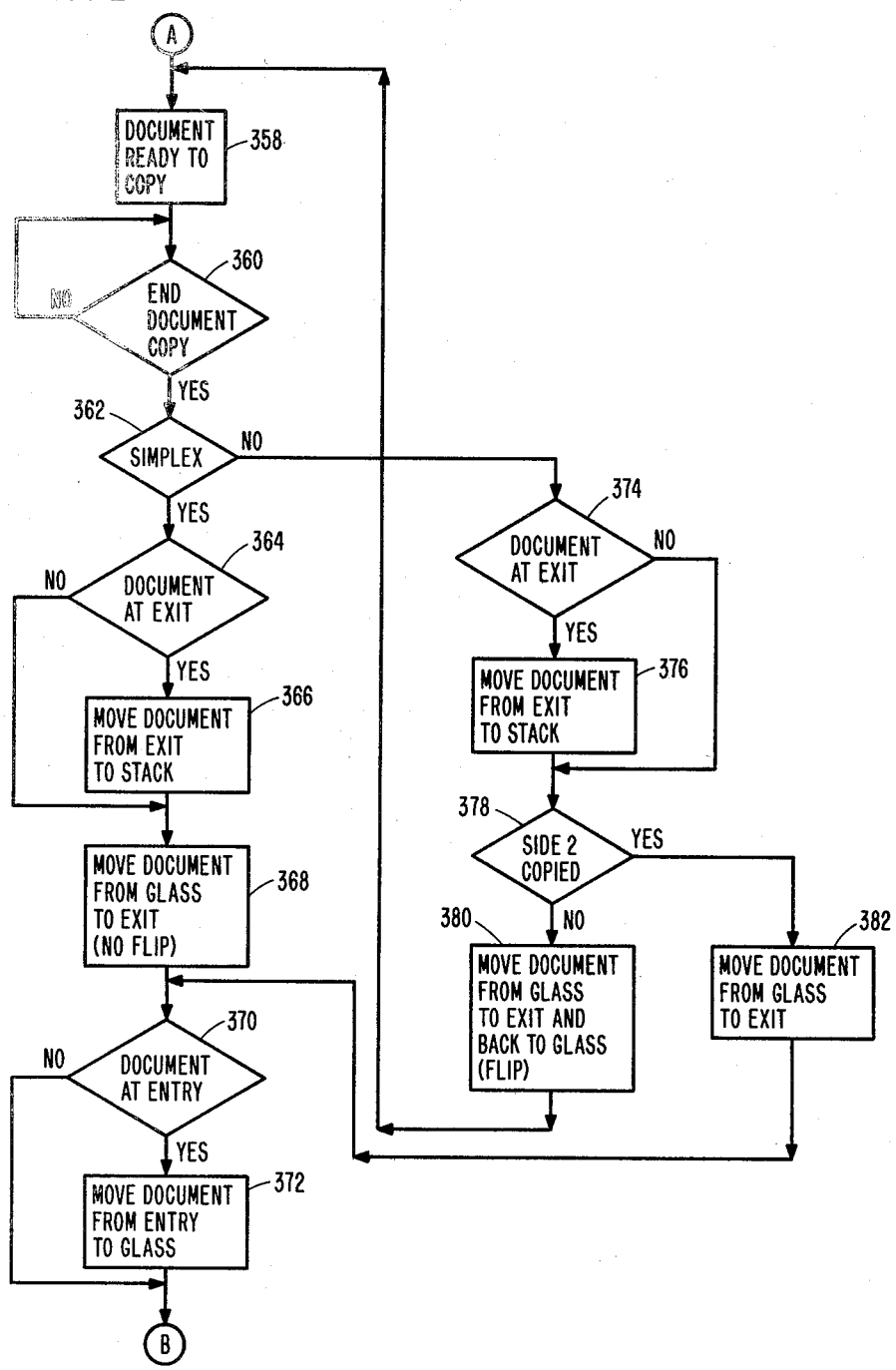

Referring now to FIGS. 11A and 11B, a flowchart discloses a series of process steps used to program the main microcomputer. It should be noted that it is well within the skill of a programmer to generate other flowcharts without departing from the scope of the present invention. As was stated previously, the basic function of the RADF is to feed documents serially to the document platen where it is copied single or double-sided and restacked in the original order in the RADF. To this end, the document feeder picks documents one at a time from the top of a set of originals, and feeds them to the document glass of the copier. After proper placement on the glass, the document is either flashed or scanned and illuminated for transfer of the image to the photoconductor. After the desired number of exposures, the document is returned to the document tray and is restacked at the bottom of the set of originals.

Still referring to FIGS. 11A and 11B, the program controls the document feeder to pick a first document from the top of a set of originals and feed the document to the document glass of a copier. After proper registration on the glass, the picked first document is copied. Simultaneous with copying the first document on the document platen, a second document is loaded in the entry turnaround means 22 (FIG. 3) while another third document is held onto the vacuum picker device. The first document, after it is copied, is fed off the document glass into the exit turnaround means 24 where it is held until the copier signals the microprocessor controller that the copy which corresponds to the first document was successfully completed. Once this is done, the first document sitting in the exit turnaround is fed into the document support tray 16 and is restacked at the bottom of the stack. This procedure of holding the next document in the entry turnaround and holding the document just copied in the exit turnaround, enables the machine in the situation where there is error to recapture the last copied document and immediately return it to the document platen for recopying.

The first step occurring after the microprocessor enters the program shown in FIG. 11A is identified by numeral 330. This is a decisional step and the program tests to see if the document (DOC) is ready (RDY) to be copied. That is, has the document tray been loaded, are the covers closed, and, most importantly, has a start feed command been received from the copier. If the document is not ready, then the program enters into a loop and the test is repeated. Once the document is ready, the program exits the step in the path identified by Y (yes) and executes steps 332, 334 and 336. In step 332 the RADF is started. In step 334 the program controls a picker to pick the first document. Likewise in step 336 the program controls the RADF to move the document from the picker to the entry turnaround means. With the document sitting in the entry turnaround means, the program executes decisional step 338 where the program checks to see if the stack marker has cycled through the stack. The stack marker is a conventional mechanical device which is associated with a document tray and informs the system when a stack has been completely cycled through. If the stack is not cycled through, then the program exits step 33 along the no (N) path to step 340. In step 340 the program controls the system to pick the next document from the document tray. The program executes decisional step 342 to see if there is a document on the glass. If the answer is yes, then the program enters the A routine. This A routine will be shortly described.

If there is no document on the glass at step 342, step 344 is executed to move the document from the entry turnaround means to the document glass. The program then executes step 346 to test whether there is a document on the picker. If there is no document on the picker, the program then loops back to step 338 and performs the previously described steps 338 through 346.

However, if there is a document at the picker at step 346, the program executes step 348 causing the RADF to move the document from the picker to the entry turnaround means. The program then loops back to step 338 to once again check for the end of the stack of originals.

Returning again to decisional step 338, if the end of stack marker indicates that the stack is cycled through, then the program executes decisional step 350. In decisional block 350 the program tests to see if there is a document at the entry turnaround. If the answer is yes, the program executes functional step 344 where it controls the RADF to move the document from the document glass and the processing is continued in the order previously described.

However, if there is no document at the entry at step 350, then the program executes decisional step 352. In decisional step 352 the program tests to see if there is a document on the document glass. If there is none, the program executes step 354. In operational step 354, the program controls the RADF to move the document from the exit to the stack. The program then executes step 356 to signify that the job is completed and the RADF is turned off. In the event that n sets are to be made, the above-described steps are repeated n times.

Returning again to decisional step 352, if the test indicates that there is a document on the document glass, then the program enters routine A. It should be noted at this point that routine A is also entered if the decision performed in decisional step 342 is positive. The first step 358 in routine A tests to see if the document is ready to be copied. From step 358 the program executes decisional step 360. In step 360 the program tests to see if the copying process is completed (END DOC COPY). If copying is not completed, then the program goes into a loop. If it has, then the program executes decisional step 362. In step 362, the program tests to see if the document is simplex or duplex. If the document is a simplex copy, the program executes decisional step 364. In step 364, the program tests to see if there is a document at the exit turnaround means. If there is, the program executes step 366 to move the document from the exit turnaround to the stack. The program then executes step 368 to move the document from the glass to the exit. It should be noted that this is a simplex document so there is no flipping (NO FLIP) of the document for return to the glass. Referring for the moment to step 364, if there is no document at the exit turnaround, then the function in step 366 is skipped and the program executes step 368. From step 368 the program executes decisional step 370. In step 370, the program tests to see if there is a document at the entry turnaround means. If there is none, the document exits along the no path. If there is, the program executes step 372 where a document is moved from the entry to the glass.

Referring back to decisional step 362, if the document is a duplex document, the document has to be flipped, returned to the document glass for side two copying and then restacked at the bottom of the stack. To this end the program executes decisional step 374. In step 374 the program checks to see if there is a document at the exit. If there is, the program execute operational step 376. In step 376 the program moves the document from the exit turnaround to the stack and executes decisional step 378. With reference to step 374, if there is no document at the exit, then the operation in step 376 is skipped and the program executes step 378. In step 378 the program checks to see if side two copying is completed. If copying of side one is completed, then the program executes step 380. In step 380 the program forces RADF to transport the document around the duplex path of the exit turnaround where the document is flipped and is returned to the glass for side two copying. From step 380 the document pursues the A routine previously described.

Referring back to decisional step 378, if copying of side two of the duplex document is completed, then the program executes step 382. In step 382 since side two is completed, the program controls the RADF to move the document from the document platen along the duplex path for a partial traverse of the exit turnaround. The document is then restacked into the bottom of the stack. The program then exits step 382 to perform the routine previously described. By programming a microprocessor so that it performs the above enumerated steps, the RADF, according to the teaching of the present invention, will sequentially transfer sheets from the top of a stack, load them up along the sheet transfer path and after copies are made, restack them in the supply tray.

Figure 10:
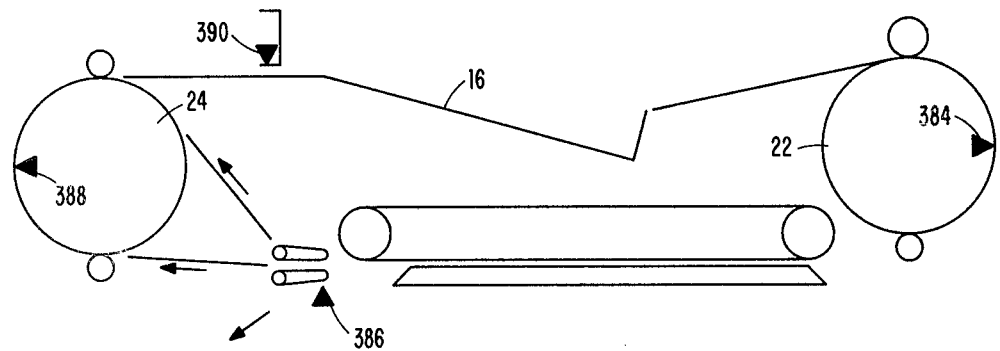
FIG. 10 shows a schematic of the RADF with sensors disposed at strategic points of the paper path.

FIG. 10 shows a schematic of the RADF, according to the teaching of this invention, and the sensors which are disposed at strategic points along the paper path. The sensors ae used primarily for detecting the progress of paper through the RADF and for error checking in the RADF. Sensor's output are utilized by the controller to perform testing for paper progress and also errors occurring in the machine. Sensor 384 is deposited within the paper channel associated with the entry turnaround means 22. The function of sensor 384 hereinafter referred to as the entry turnaround sensor, is to generate a signal when a sheet enters and leaves the entry turnaround. Although any type of sensor can be used, in the preferred embodiment of this invention the sensor is of the light-emitting/light-receiving type. Another set of sensors (not shown) which is disposed within the channel associated with the entry turnaround is the so-called entry skew sensors. These sensors include a pair of sensors disposed in spaced relationship, preferably along the outer paper path. As such, by counting the delay between the making of each sensor, one can determine the skew associated with a certain sheet traversing along its path.

Glass reference sensor (GRS) 386 is disposed downstream from the platen transport belt in the direction of forward paper movement. This sensor is utilized with the platen transport belt for registering a paper sheet at the document platen. A more detailed description is given in Application Ser. No. 262,727, filed May 11, 1981, entitled "Document Feeder Electronic Registration Gate."

Exit turnaround means sensor 388 is disposed within the exit turnaround means 24. The function of the exit turnaround sensor 388 is to measure the progress of paper through the exit turnaround channel. As was described relative to the entry turnaround means 22, a pair of skew sensors (not shown) are deposited in the sheet transport channel of the exit turnaround means. The orientation of the skew sensing sensors are substantially equivalent to that described relative to the entry turnaround means. A pair of skew sensing sensors having the same configuration are also disposed relative to the document platen. The function of the skew sensors at the platen is to measure the skew associated with the sheet as it is disposed thereon. Sensor 390 is disposed at the entrance to the document tray 16. The function of the tray sensor is to sense when the trailing edge of a sheet clears the entrance to the tray and generates a signal which activates the kicker mechanism to temporarily leave the stack and force a newly inserted sheet to join the bottom of the stack.

As was stated previously, the sensors, together with the microprocessor, check the progress of paper through the system and check for skew associated with sheets. One type of check which is performed is the arrival check. This check ensures that the paper sheet arrives at a particular point of the paper path within a specified period of time. To this end, tachometer counts from the three motors are used as a reference for assuring paper is moving properly from one station to the next. Timers associated with the microprocessors are used to detect excessive skew. By way of example, the time when a skew sensor is picked is noted. Unless the associated skew sensor is picked within a predetermined time period, a skew error is generated.

Another type of check is the departure check. This check assures that documents are departing various stations properly in terms of time and skew. This check also provides coverage for detection of most double sheet feeds. Another type of check is the so-called open loop control time check. In the open loop control time check, certain functions are given a predetermined period of time to be completed. If the function is not completed within the allotted time, an error signal is generated. By way of example, sensors and switches (not shown) are used to monitor the completion of a task associated with subsystems such as the picker mechanism and the kicker mechanism. The switches and sensors are monitored at certain intervals in the operation to see if the task is completed. Timer interrupts are used to initiate the various checks.

Another type of check is a gross timing check. An instance where the above-described control program passes commands to slave microprocessor (microprocessor 2) a gross time-out is started by the main control microprocessor. The time-out usually exceeds the maximum time that a given operation will take. This provides coverage for failures in slave routines that prevents "end" status from being incorrectly transferred from the slave processor to the main processor.

Relative to the picker mechanism, pick failures are retried once. The retry occurs in the next document cycle. If the failure repeats, no further retries are attempted but the documents that remain in the other sections of the RADF are processed until they are restacked in the document tray.

Figure 12:
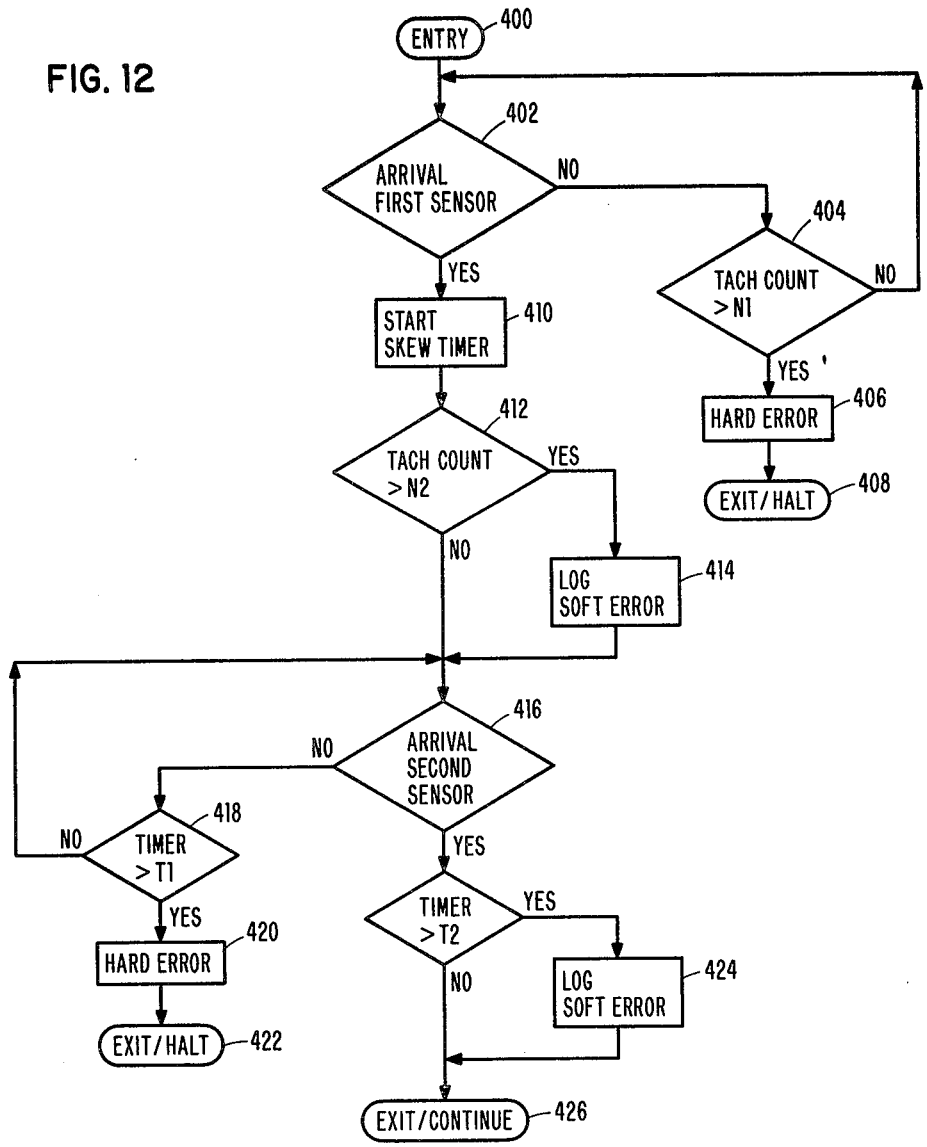
FIG. 12 shows a routine for a paper positional check and skew check.

FIG. 12 shows a program routine for a paper positional check and skew check. The first step in the program is identified by numeral 400 and is called the entry step. The program is entered via a polling routine on tachometer count or interrupt routine based on tach count. From step 400 the program executes decisional step 402. In step 402 the program tests to see if the sheet arrives at sensor 384 (FIG. 10—hereinafter called first sensor). If the sheet did not arrive, the program executes decisional step 404. In step 404, the program checks to see if the tach count associated with the entry turnaround is greater than a predetermined number N1. The number N1 is selected so that under normal operating conditions, the paper would have been present within the turnaround. If the tach count is less than the predetermined number N1, the program goes into a loop. If the tach count is greater than N1, this signifies a catastrophic situation referred to as a "Hard Error" in step 406. The program exits in step 408 and closes the machine down.

Referring back to decisional step 402, if the paper arrives at the first sensor, then the program executes step 410 to start a skew timer. It is worthwhile noting at this point and with reference to FIGS. 6 and 7 that a plurality of multipurpose counters are attached to the microprocessor. As such, depending on the routine being performed, the microprocessor can assign one of those counters to perform the skew count. The skew counter is started from the signal generated from the first of the skew sensors to be picked. From step 410, the program executes step 412. In step 412, the program tests to see if the tach count exceeds N2. N2 is a number which is associated with a permissible arrival time condition which, if the time when the first sensor is picked is greater than N2, then the error is referred to as a soft error and the program executes step 414. In step 414, the program logs the soft error. This completes the arrival time test. It should be noted that the tachometer (tach) count is a measure of paper progress in the paper path. Also, the hard errors shut the RADF down while the soft error is logged. The above test is also utilized to check paper progress in the exit turnaround.

The other test relative to paper checking and skew begins with step 416. In step 416 the program tests to see if the sheet arrives relative to a second sensor (not shown). The sensor is also disposed in the entry turnaround. If it does not, then the program executes step 418. In step 418, the program tests to see if the timer is greater than T1. T1 is the time limit for skew. If the time is not greater than T1, the program goes into a loop. If it is greater than T1, this indicates a hard error, and the program executes step 420. The program then executes step 422 and the RADF is halted.

Referring back to step 416 for the moment, if the sheet arrives at the second sensor, but at some time greater than T2, then a soft error occurs and the program executes step 424. In step 424 the program logs the error and continues processing via step 426.

From the above, it should be seen that in the error checking routine associated with the present invention, there are two types of errors; catastrophic errors in which the machine is halted instantaneously and as such minimizes damage to original documents and the so-called soft error which is not catastrophic but is logged so that the operator is aware of the fact that elements in the system may be failing.

OPERATION

The document handling device according to the present invention preferably includes a servo-controlled recirculating document feeder. The feeder includes a plurality of document transport elements independently servo-controlled but is driven from a common reference signal source generating means. More particularly, the document feeder includes a sheet picker mechanism 74 (FIG. 2) and a vacuum picker transport belt 86. The picker mechanism picks documents from document supply tray 16 while the picker transport belt transports a picked sheet into the entry turnaround means 22. After a document is picked, the entry turnaround means advances the first document until its trailing edge has cleared the picked area. The entry turnaround means is then stopped and the first document is in the entry preload area. A second document is now picked. Next the platen transport belt 18 and entry turnaround means 22 are started and the first document is transferred to the transport belt and the entry stops with the second document in the preload position. A third document is now picked. Meanwhile the transport belt stops with the first document registered and exposure takes place. If the document is simplex, the gating mechanism 132 (FIG. 2) is configured into alignment with the simplex sheet path. The entry turnaround, transport belt and exit turnaround are now started. The first document is moved through the exit turnaround and is held momentarily until the copier signifies that copies for the first document is successfully completed. The document in the exit turnaround is now deposited in the paper tray. The second document is next transferred to the transport belt for registration. The third document is preloaded into the entry. After motion is stopped, a fourth document is picked. This entire process continues until all documents in the paper tray have been processed. The processing of the last document is indicated by a signal from the mechanical pointer which monitors the stack to see when an original stack is cycled through at least once.

If the documents being processed are duplex, then the first document picked is flipped in a manner previously described and reregistered for exposure of side two. In this case the gating mechanism is set so that the document transfers the duplex path. Only the platen transport belt and the exit turnaround are started to the left and the first document travels up the duplex path. As soon as the trailing edge of the document leaves the transport belt, the transport belt is stopped and accelerated to the right. As soon as the trailing edge of the document clears the duplex gate, the gate is set so that the document traverses the simplex paper path permitting the document to return to the transport belt. After the transport belt receives the first document, both the exit and the transport belt are stopped and side two is ready for exposure. After exposure, the duplex gate is set to align with the duplex path. The exit and transport belt are started to move the first document to the left and up the duplex path. The first document is transferred from the transport belt to the exit turnaround and then both transports are stopped. With the first document trapped into the exit turnaround, the exit is started to the right to deposit the first document in the paper tray with side one facing upwardly. At the same time the platen transport belt and entry are started to the left. When motion is complete, side one of the second document is ready for exposure. The third document is in the entry preload position and the fourth document is attached to the picker mechanism. The process is repeated until all documents have been processed.

The above operational description illustrates independent and control motion needed between the various elements. In order to get predictable and matched dynamics between the elements, servo systems are attached to each of the three transports. As shown in FIGS. 4 and 5, the servos are all tied to a common reference oscillator to ensure that the dynamics of the system are matched. The elements are each driven by a DC motor and feedback is derived from a digital tach or position encoders to provide velocity and position information. Thus the servos provide dynamics matching and permit a smooth document transfer from one element to the other. Several benefits insure to the user of the above-described recirculating automatic document feed. By way of example, by utilizing independently servo-controlled elements, independent motion is possible to permit document motion in certain areas of the paper path while documents are at rest in other areas.

The control system permits a single turnaround to flip both simplex and duplex originals.

The control system enables error recovery due to malfunction in the copying machine since documents are stopped and held in the exit turnaround area until all exposure of that particular document have been developed from the photoconductor.

The matched dynamics between elements result in smooth document transfer from one element to another which prevents document damage and build-up of static electricity.

Essentially zero relative velocity between the transport belt and the document during transfer permits reliable document attachment to the transport belt.

Essentially zero relative velocity exists between originals and elements in contact with originals. This results in very small static build-up and minimizes the chances for damaging originals.

The servos operate predictably in an environment of changing parameters due to friction, motor parameters, etc. Servo elements permit high performance which result in high reliable throughput.

Documents are always returned to the stack in their original orientation (same side facing upward) with minimum amount of sheet handling. This is important for error recovery and for guaranteeing proper sequencing of copy sheets when more than one set is to be generated.

Duplexing occurs at full throughput rate and is fully automatic.

The use of vacuum belt transport to hold sheets above the document glass prevents the build-up of static electrical charges on the documents. The absence of static electrical charges enhances the reliability of the sheet feeding operations.

While the invention has been particularly shown and described with reference to a preferred embodiment thereof, it will be understood by those skilled in the art that various changes in form and details may be made therein without departing from the spirit and scope of the invention.

What is claimed is:

1. A recirculating document feeder suitable for supplying sheets to the document platen of a convenience copier comprising;
- a document tray for supporting a stack of sheets;
- a plurality of independently driven document transport means disposed relative to the platen and operable to circulate sheets from said document tray onto the platen and back to said document tray;
- a plurality of servo loops, each dedicated to drive one of the document transport means;
- a common source for generating reference signals;
- a controller means operable to process feedback signals outputted from the servo loops with the reference signal to generate control signals to enable sheet speed synchronization of at least two of the plurality of transport means when sheets are transferred from one transport means to another;
- a sheet deflection means including:
- a drive roller;
- a first plurality of wire elements mounted in spaced alignment with each other and adjacent to the drive roller;
- a first back-up roller mounted in spaced alignment with the drive roller and cooperating therewith to form a first sheet transport nip;
- a second back-up roller mounted in spaced alignment with the drive roller, said second roller being disposed approximately 180° from the first back-up roller and coacting with the drive roller to form a second sheet transport nip;
- a second plurality of wire elements mounted adjacent to the second back-up roller; and
- control means for positioning the wire elements so that they form distinct paper transport paths, one path for receiving sheets from said first transport nip and a second path for receiving sheets from said second transport nip.

2. The document feeder of claim 1 where the control means includes a pair of solenoids with one of each coupled to the drive roller gate and the second back-up roller gate.

3. The document feeder of claim 1 further including a drive motor coupled to the drive roller.

4. A sheet handling apparatus operable to feed sheets onto the document platen of a convenience copier so that simplex originals or duplex originals can be copied, said apparatus comprising:
- a document support tray means for holding a stack of sheets having a sheet exit station at one end and a sheet input station at the opposite end;
- entry turnaround sheet transport means connected to receive a sheet from said exit station and deliver said sheet to said document platen for moving a sheet to be copied to said platen where a first side thereof can be copied;
- exit turnaround sheet transport means including an arcuate sheet conveying channel and a roll means capable of rotation in two directions, connected to receive a sheet into said arcuate channel from said document platen and deliver said sheet to said input station, first destination, when said roll means is caused to rotate in a first direction, and connected to receive a sheet into said arcuate channel from said document platen, invert said sheet, and deliver said sheet back to said document platen, second destination, when said roll means is caused to rotate in a second direction opposite to said first direction so that a second side of said sheet can be copied;
- sheet deflecting means located adjacent said document platen and disposed relative to said exit turnaround means, positionable to a first gating position to deflect a simplex original leaving said document platen into said arcuate channel for movement in said first direction for delivery to said input station and positionable to a second gating position to deflect a duplex original leaving said document platen into said arcuate channel for movement in said second direction;
- control means to cause said entry turnaround means, said exit turnaround means, and said sheet deflecting means to provide for the movement of said sheet in a timed relationship;
- document platen sheet transport means for receiving a sheet from said entry turnaround means, for moving said sheet across said document platen to position said sheet for a copying operation;
- first motive means for driving said entry turnaround means;
- second motive means for driving said document platen sheet transport means;
- and wherein said control means further includes servo systems for controlling said first motive means and said second motive means for synchronizing the speed of sheet movement of said entry turnaround means and said document platen sheet transport means at a time when said sheet is moved from said entry turnaround means to said document platen sheet transfer means, and for allowing said first motive means to act independently of said second motive means at other times.

5. The sheet handling apparatus of claim 4 further including:
- document platen sheet transport means for delivering a sheet from a copying position on said document platen to said exit turnaround means and for receiving a sheet from said exit turnaround means;
- second motive means for driving said document platen transfer means;
- third motive means for driving said exit turnaround means;
- and wherein said control means further includes servo systems for controlling said second motive means and said third motive means for synchronizing the speed and direction of sheet movement of said document platen sheet transport means and said exit turnaround means at a time when said sheet is interchanged between said document platen sheet transport means and said exit turnaround means, and for allowing said second motive means and said third motive means to act independently at other times.

6. The sheet handling apparatus of claim 5 wherein:
- said document platen sheet transport means is also for receiving a sheet from said entry turnaround means and for moving said sheet across said document platen to position said sheet for a copying operation;
- first motive means for driving said entry turnaround means;
- and wherein said control means further includes servo systems for controlling said first motive means and said second motive means for synchronizing the speed of sheet movement of said entry turnaround means and said document platen sheet transport means at a time when said sheet is moved from said entry turnaround means to said document platen sheet transfer means, and for allowing said first motive means to act independently of said second motive means at other times.

7. A recirculating automatic document feeder for use with a document copier machine operable to feed sheets to be copied to a document platen comprising:
a document support tray means for holding a stack of sheets having a sheet exit station at one end and a sheet input station at the opposite end;
entry turnaround sheet transport means connected to receive a sheet from said exit station and deliver said sheet to said document platen;
document platen sheet transport means connected to receive a sheet from said entry turnaround means and to move said sheet across said document platen to position said sheet for a copying operation;
exit turnaround sheet transport means connected to receive a sheet from said document platen sheet transport means and deliver said sheet to said sheet input station;
first motive means for driving sheets through said entry turnaround means;
second motive means for driving sheets through said document platen sheet transport means;
third motive means for driving sheets through said exit turnaround means; and
control means for controlling the first, second and third motive means to enable independent operation of each of the sheet transport means one from another and to enable sheet speed synchronization of at least two of said sheet transport means at a time when said sheet is interchanged from one of said sheet transport means to another of said sheet transport means.

8. The recirculating document feeder of claim 7 wherein:
said exit turnaround means includes a common arcuate sheet transport channel, a simplex entry channel, a duplex entry channel, a first exit channel, and a second exit channel, both of the entry channels connected to receive sheets exiting from said document platen and connected to said common arcuate channel, the first said exit channel connected to said arcuate channel and to said input station at said document support tray, the second said exit channel coextensive with said simplex entry channel to deliver sheets to be copied back to said document platen;
said control means including means to control the movement of a simplex sheet into said simplex entry channel, around said common arcuate channel in a first direction and out said first exit channel;
said control means also including means to control the movements of a duplex sheet into said duplex entry channel, around said arcuate channel in a second direction opposite to said first direction and back onto said document platen through said second exit channel; and
said control means also including means to control the movement of a duplex sheet into said duplex channel, at least partially around said arcuate channel in said second direction, and then back through said arcuate channel in said first direction to said input station of said document support tray means through said first exit channel.

9. The recirculating document feeder of claim 8 wherein:
said control means further includes means to delay movement of a sheet into the exit channels for a time period sufficient to receive a signal from said copier machine indicating that a copy corresponding to said sheet has been successfully produced and delivered to its destination.

* * * * *